United States Patent
Jing et al.

(10) Patent No.: US 8,346,604 B2
(45) Date of Patent: *Jan. 1, 2013

(54) FACILITATING BIDDING ON IMAGES

(75) Inventors: Yushi Jing, Mountain View, CA (US);
Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/415,410

(22) Filed: Mar. 8, 2012

(65) Prior Publication Data

US 2012/0166293 A1 Jun. 28, 2012

Related U.S. Application Data

(63) Continuation of application No. 11/966,518, filed on Dec. 28, 2007, now Pat. No. 8,156,001.

(51) Int. Cl.
*G06Q 30/00* (2012.01)
(52) U.S. Cl. .................. 705/14.4; 705/14.71; 705/26.3; 705/37
(58) Field of Classification Search ................ 705/14.4, 705/14.71, 26.3, 37
See application file for complete search history.

(56) References Cited

U.S. PATENT DOCUMENTS

| | | | |
|---|---|---|---|
| 6,393,147 B2 | 5/2002 | Danneels et al. | |
| 6,504,571 B1 | 1/2003 | Narayanaswami et al. | |
| 7,359,944 B2 | 4/2008 | An | |
| 7,751,805 B2 | 7/2010 | Neven et al. | |
| 2001/0007980 A1 | 7/2001 | Ishibashi et al. | |
| 2002/0107759 A1 | 8/2002 | An | |
| 2002/0188532 A1 | 12/2002 | Rothstein | |
| 2005/0018216 A1 | 1/2005 | Barsness et al. | |
| 2005/0096980 A1 | 5/2005 | Koningstein | |
| 2005/0144064 A1 | 6/2005 | Calabria et al. | |
| 2006/0195858 A1 | 8/2006 | Takahashi et al. | |
| 2006/0221232 A1 | 10/2006 | Yu et al. | |
| 2006/0262352 A1 | 11/2006 | Hull et al. | |
| 2006/0262976 A1 | 11/2006 | Hart et al. | |
| 2007/0198343 A1 | 8/2007 | Collision et al. | |
| 2007/0198344 A1 | 8/2007 | Collision et al. | |
| 2007/0233562 A1 | 10/2007 | Lidwell et al. | |
| 2008/0021710 A1 | 1/2008 | Ho | |

(Continued)

OTHER PUBLICATIONS

Mizutani et al., "Commercial Detection In Heterogeneous video Streams Using Fused Multi-Modal And Temporal Features", Columbia University ADVENT Technical Report @204-2004-4 Columbia University, Sep. 2004, http://www.google.com/url?sa=t&ct=res&cd=1&url=http%3A%2F%2Fwww.ee.columbia.edu%2F-mizutani%2Fresearch%2Fpaper.pdf&:ei=BjYPR938Cp7OetL4pY8N&usg=AFQjCNGt3xxKdG06411EdxwhlgY_vdKW_PA&sig2=0bUA5AJgakHHSXuK5yYaCA, reprinted from the Internet, pp. 1-4.

(Continued)

*Primary Examiner* — Jagdish Patel
*Assistant Examiner* — Sara C Hamilton
(74) *Attorney, Agent, or Firm* — Fish & Richardson P.C.

(57) ABSTRACT

Techniques are described for facilitating bidding on images. The techniques may include receiving bids includes presenting a first image and a bid associated with the first image. The first image is similar to a second image for which a bid is to be submitted for presenting sponsored content based on the second image. A bid is received for presenting a sponsored-content item based on the second image. The received bid is stored in association with second image and a sponsored-content item based to be presented based on the bid and the second image.

18 Claims, 20 Drawing Sheets

U.S. PATENT DOCUMENTS

| | | | |
|---|---|---|---|
| 2008/0040277 | A1 | 2/2008 | DeWitt |
| 2008/0040278 | A1 | 2/2008 | DeWitt |
| 2008/0091527 | A1 | 4/2008 | Silverbrook et al. |
| 2008/0097859 | A1 | 4/2008 | Schrenk |
| 2008/0109285 | A1 | 5/2008 | Reuther et al. |
| 2008/0109300 | A1 | 5/2008 | Bason |
| 2008/0109306 | A1 | 5/2008 | Maigret et al. |
| 2008/0120178 | A1 | 5/2008 | Martinez et al. |
| 2008/0126191 | A1 | 5/2008 | Schiavi |
| 2008/0201731 | A1 | 8/2008 | Howcroft |
| 2008/0263583 | A1 | 10/2008 | Heath |
| 2008/0319839 | A1 | 12/2008 | Olliphant et al. |
| 2009/0006191 | A1 | 1/2009 | Arankalle et al. |
| 2009/0006375 | A1 | 1/2009 | Lax et al. |
| 2009/0112692 | A1 | 4/2009 | Steelberg et al. |
| 2009/0144124 | A1 | 6/2009 | Surendran et al. |
| 2009/0157502 | A1 | 6/2009 | Cooper et al. |
| 2009/0164301 | A1 | 6/2009 | O'Sullivan et al. |
| 2009/0199230 | A1 | 8/2009 | Kumar et al. |
| 2009/0204511 | A1 | 8/2009 | Tsang |
| 2009/0216623 | A1 | 8/2009 | Hendricks et al. |
| 2009/0232354 | A1 | 9/2009 | Camp et al. |
| 2010/0082439 | A9 | 4/2010 | Patel et al. |
| 2010/0198732 | A1 | 8/2010 | Sim et al. |

OTHER PUBLICATIONS

Covell et al., "Advertisement Detection And Replacement Using Acoustic And Visual Repetition, In Proceedings Of Multimedia Signal Processing", Multimedia Signal Processing, 2006 IEEE 8th Workshop, Oct. 2006, http://www.esprockets.com/papers/ad_segment_mmsp2006.pdf, reprinted from the Internet, pp. 1-6.

Covell et al., "Detecting Ads in Video Streams Using Acoustic and Visual Cues in Computer", *Computer*, IEEE Computer Society, Dec. 2006, http://www.esprockets.com/papers/computer_Dec06.pdf, reprinted from the Internet, pp. 135-137.

Baluja et al., "Content Fingerprinting Using Wavelets", in Proceedings of Conference on Visual Media Production, Visual Media Production, 2006, http://www.esprockets.com/papers/cvmp_BalujaCovell.A4color.pdf, reprinted from the Internet, pp. 1-10.

U.S. Appl. No. 11/966,471, for "Providing Information In An Image-Based Information Retrieved System", filed Dec. 28, 2007.

U.S. Appl. No. 11/966,429, for "Placing Sponsored-Content Associated With An Image", filed Dec. 28, 2007.

U.S. Appl. No. 11/966,616, for "Selecting Advertisements To Present", filed Dec. 28, 2007.

U.S. Appl. No. 11/966,587, for "Placing Sponsored-Content Based On Images In Video Content", filed Dec. 28, 2007.

FACILITATING BIDDING ON IMAGES

CROSS-REFERENCE TO RELATED APPLICATIONS

This is a continuation of U.S. application Ser. No. 11/966,518 filed Dec. 28, 2007. All subject matter set forth in the above referenced application is hereby incorporated by reference into the present application as if fully set forth herein.

TECHNICAL FIELD

The subject matter of this application is generally related to advertising.

BACKGROUND

Interactive media (e.g., the Internet) has great potential for improving the targeting of advertisements ("ads") to receptive audiences. For example, some websites provide information search functionality that is based on keywords entered by the user seeking information. This user query can be an indicator of the type of information of interest to the user. By comparing the user query to a list of keywords specified by an advertiser, it is possible to provide targeted ads to the user.

Another form of online advertising is ad syndication, which allows advertisers to extend their marketing reach by distributing ads to additional partners. For example, third party online publishers can place an advertiser's text or image ads on web properties with desirable content to drive online customers to the advertiser's website. An example of such a system is AdSense™ offered by Google, Inc.

SUMMARY

In one general aspect, bids are received by presenting, in a graphical user interface displayed on a display device, a reference image in association with a reference bid. The reference image is similar to a bid image for which a bid is to be submitted for presenting an advertisement with the bid image. The reference bid having been selected by an automated process without human intervention and based on similarity with the bid image. User input representing a bid for advertising based on the bid image is received. The received bid is stored in association with the bid image and an advertisement to be presented based on the bid and the bid image.

In another general aspect, receiving bids includes presenting a first image and a bid associated with the first image. The first image is similar to a second image for which a bid is to be submitted for presenting sponsored content based on the second image. A bid is received for presenting a sponsored-content item based on the second image. The received bid is stored in association with second image and a sponsored-content item based to be presented based on the bid and the second image.

Implementations may include one or more of the following features. For example, presenting a first image and a bid associated with the first image may include presenting on a display device a first image and a bid associated with the first image. Receiving a bid may include receiving a bid while the first image and the bid associated with the first image are being presented on the display device. A user may be enabled to browse a collection of images and bids associated with images in the collection of images.

The second image may include a collection of images. The collection of images may be received and stored. The received bid may be stored in association with the collection of images and the sponsored-content item to be presented based on the bid and at least one image in the collection of images.

The second image may be received. An indication of a portion that is less than all of the second image may be received. The stored images may be analyzed to identify a stored image that includes a portion that is similar to the indicated portion of the second image. Presenting a first image may include presenting the identified stored image.

The received bid may represent a maximum bid for presenting a sponsored-content item based on the second image. Presenting a first image may include using object recognition techniques to generate a likelihood that the image includes the second image and presenting the first image based on a comparison between the likelihood and a threshold.

In yet another general aspect, a first image for which a bid is to be submitted is received. A bid is received for presenting a sponsored-content item. The sponsored-content item is to be presented based on similarity between a second image and the first image. The received bid is stored in association with the first image and the sponsored-content item. Presentation of the sponsored-content item based on the second image is enabled.

Implementations may include one or more of the features noted above and one or more of the following features. For example, receiving a first image may include receiving a collection of images. The collection of images may be stored. The received bid may be stored in association with the collection of images and the sponsored-content item to be presented based on the bid and a second image that is similar to at least one image in the collection of images.

A second image that is similar to the first image may include a second image that is identical to the first image or may include a second image that is substantially similar to the first image.

The second image may be analyzed to identify a sub-image of the second image, and the first image may be analyzed to identify a sub-image of the first image. A second image that is similar to the first image may include the sub-image of the second image that is similar to the sub-image of the first image.

A second image that is similar to the first image may be determined by using object recognition techniques to generate a likelihood that the second image is the first image and determining the second image is similar to the first image based on a comparison between the likelihood and a threshold.

An indication of a portion that is less than all of the first image may be received. A second image that is similar to the first image may be determined by analyzing stored images to identify a stored image that includes a portion that is similar to the indicated portion of the second image. The received bid may represent a maximum bid for presenting a sponsored-content item based on the first image.

Implementations of the techniques discussed above may include a method or process, a system or apparatus, or execution of computer software embodied in a computer-readable medium. The details of one or more of the implementations are set forth in the accompanying drawings and description below. Other features will be apparent from the description and drawings, and from the claims.

DETAILED DESCRIPTION

Figure 1:
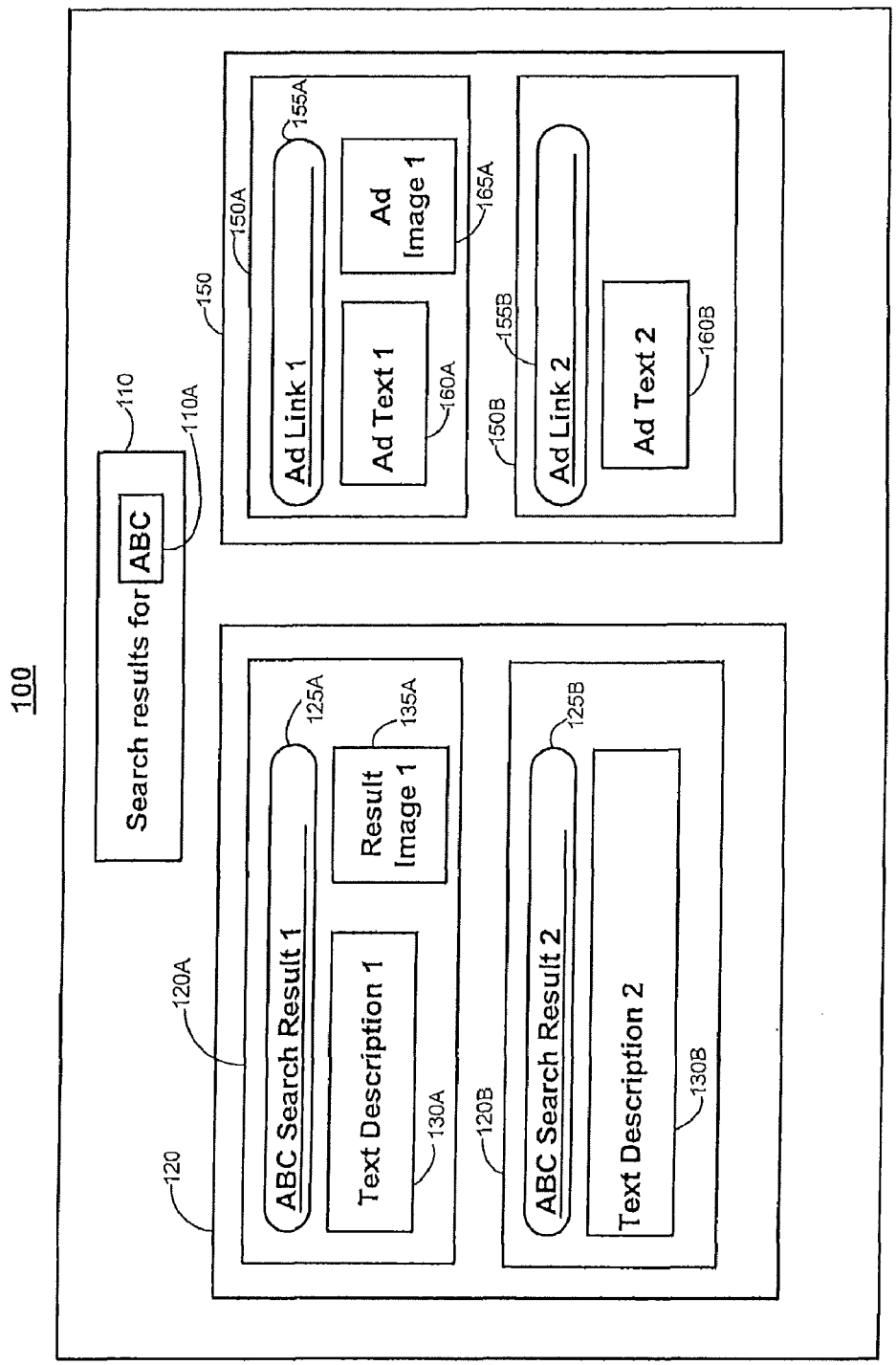
FIGS. 1-3 are block diagrams of example user interfaces in imaged-based ad targeting systems.
Figure 2:
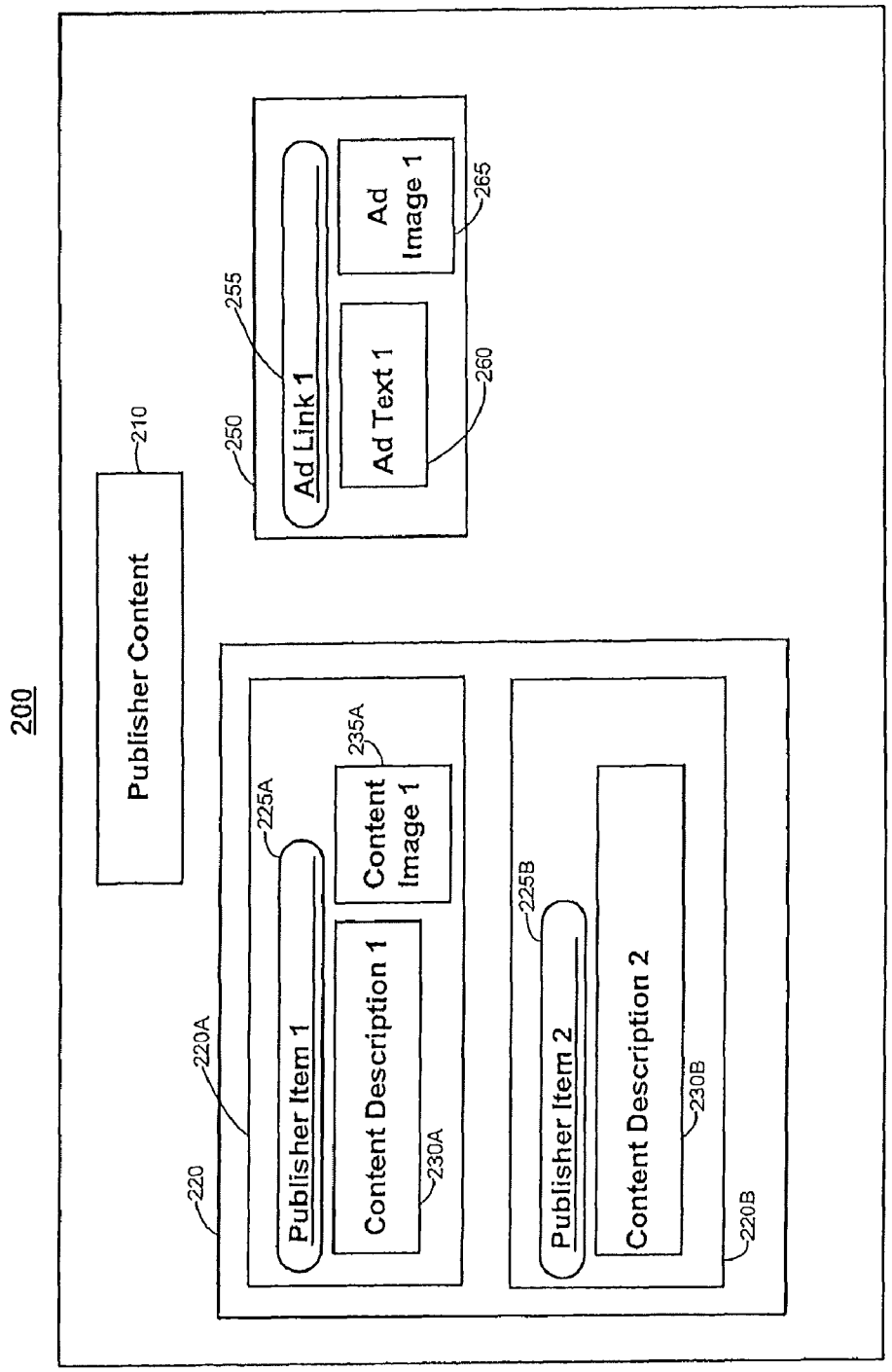
Figure 3:
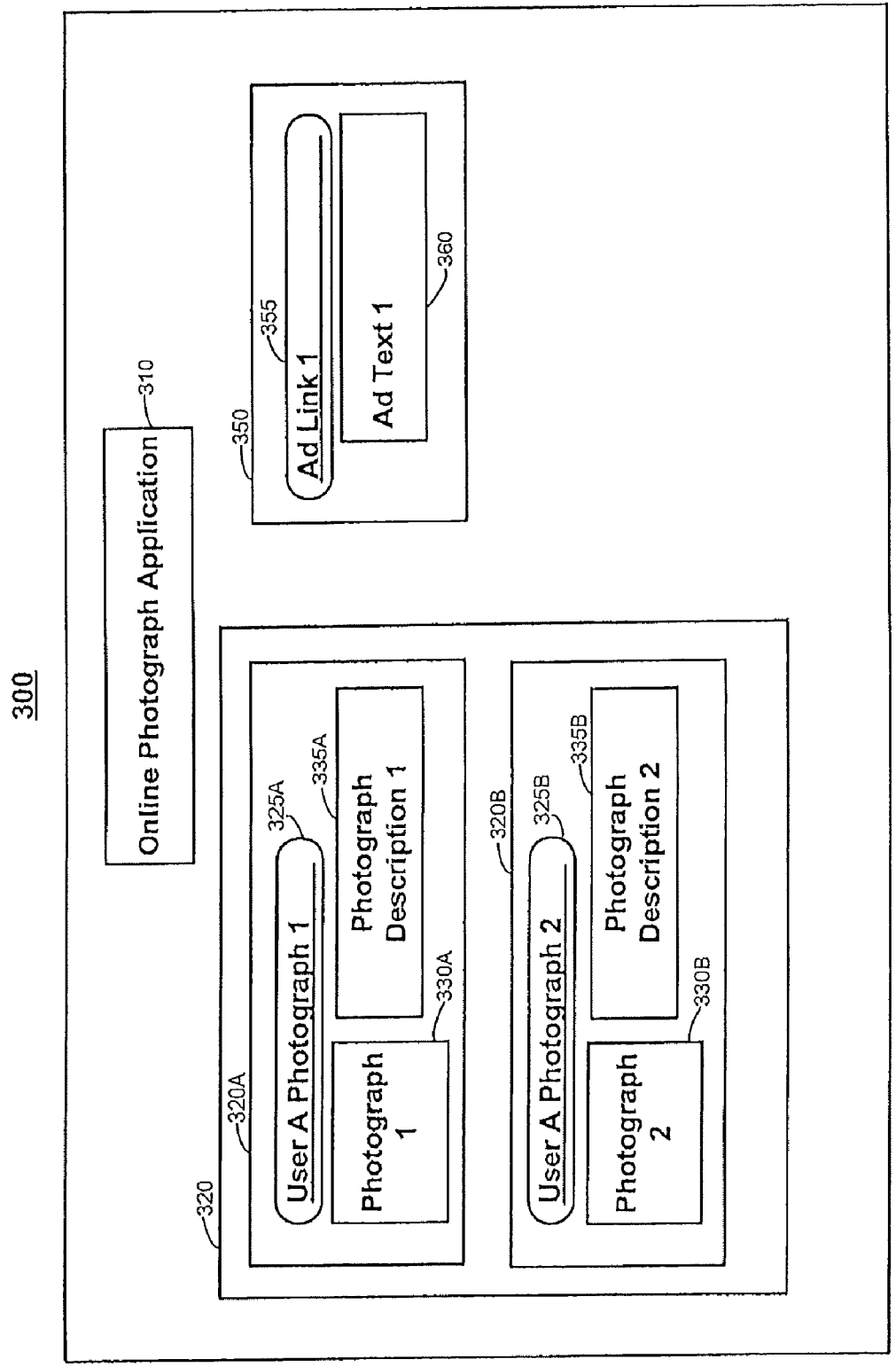

FIGS. 1-3 depicts example user interfaces in image-based ad targeting systems. In general, FIG. 1 shows an example user interface 100 in a search service that receives a query from a user, retrieves and presents relevant search results from an index of content, and presents advertisements based on the search results. More particularly, the presented advertisements are based on an image included in the search results.

As depicted in FIG. 1, the user interface 100 includes a title 110 showing a search query 110A entered by a user for which search results 120 are presented. The search results 120 include two search results 120A and 120B for the search query 110A. Each search result 120A and 120B includes a hypertext link 125A or 125B, respectively, to the web pages identified in the search index used by the search service. Each search result 120A and 120B includes a snippet of text extracted from those web pages (i.e., text descriptions 130A or 130B, respectively). Search result 120A also includes an image 135A returned with the search result 120A. The image 135A may be, for example, a graphic image, a digital photograph or a frame from a video.

The user interface 100 also includes advertisements 150 identified based on the search results 120. An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in electronic press or a broadcast. An ad may be referred to or include sponsored content.

The ads 150 include ads 150A and 150B. Each ad 150A and 150B includes a hypertext link 155A or 155B, respectively, to the advertiser's web page. Each ad 150A and 150B includes ad text 160A or 160B, respectively. Ad 150A also includes an ad image 165A. The image 165A may be, for example, a graphic image, a digital photograph or a frame from a video. The ad image 165A may be substantially similar to or the same as the search result image 135A returned with the search results 120, though the ad image 165A need not necessarily be similar to or the same as the image 135A. The ads 150A and 150B are identified and presented based on the search result image 135A, as described more fully later.

FIG. 2 depicts an example user interface 200 presented by a content provider that presents content to users. As illustrated in FIG. 1, the user interface 200 includes a title 210 and a list 220 of content items 220A and 220B. The content items 220A and 220B may be, for example, articles, discussion threads, music, audio, video, graphics, search results and webpage listings.

Each content item 220A and 220B includes a hypertext link 225A or 225B, respectively, to an associated content item (such as a web page, a music file, or a video file). Each content item 220A and 220B includes descriptions 230A or 230B. Content item 220A also includes an image 235A. The image 235A may be, for example, a graphic image, a digital photograph or a frame from a video.

The user interface 200 also includes an ad 250 identified based on the image 235A included in the content item 220A. The ad 250 includes a hypertext link 255 to the advertiser's web page, ad text 260 and an ad image 265, which may be, for example, a graphic image, a digital photograph or a frame from a video. The ad 250 is identified and presented based on the content image 235A, as described more fully later.

FIG. 3 depicts an example user interface 300 presented by a provider of an online photograph application. As illustrated in FIG. 3, the user interface 300 includes a title 310 and a list 320 of photograph items 320A and 320B for a user who is a subscriber of the online photograph application.

Each photograph item 320A and 320B includes a hypertext link 325A or 325B, respectively, to an associated photograph. Each photograph item 320A and 320B includes a small representation (e.g., a thumbnail) 330A and 330B of the associated photograph and a description 335A or 335B.

The user interface 300 also includes an ad 350 identified based on the photograph item 320A and/or photograph item 320B, as described more fully later. The ad 350 includes a hypertext link 355 to the advertiser's web page, and ad text 360.

Figure 4:
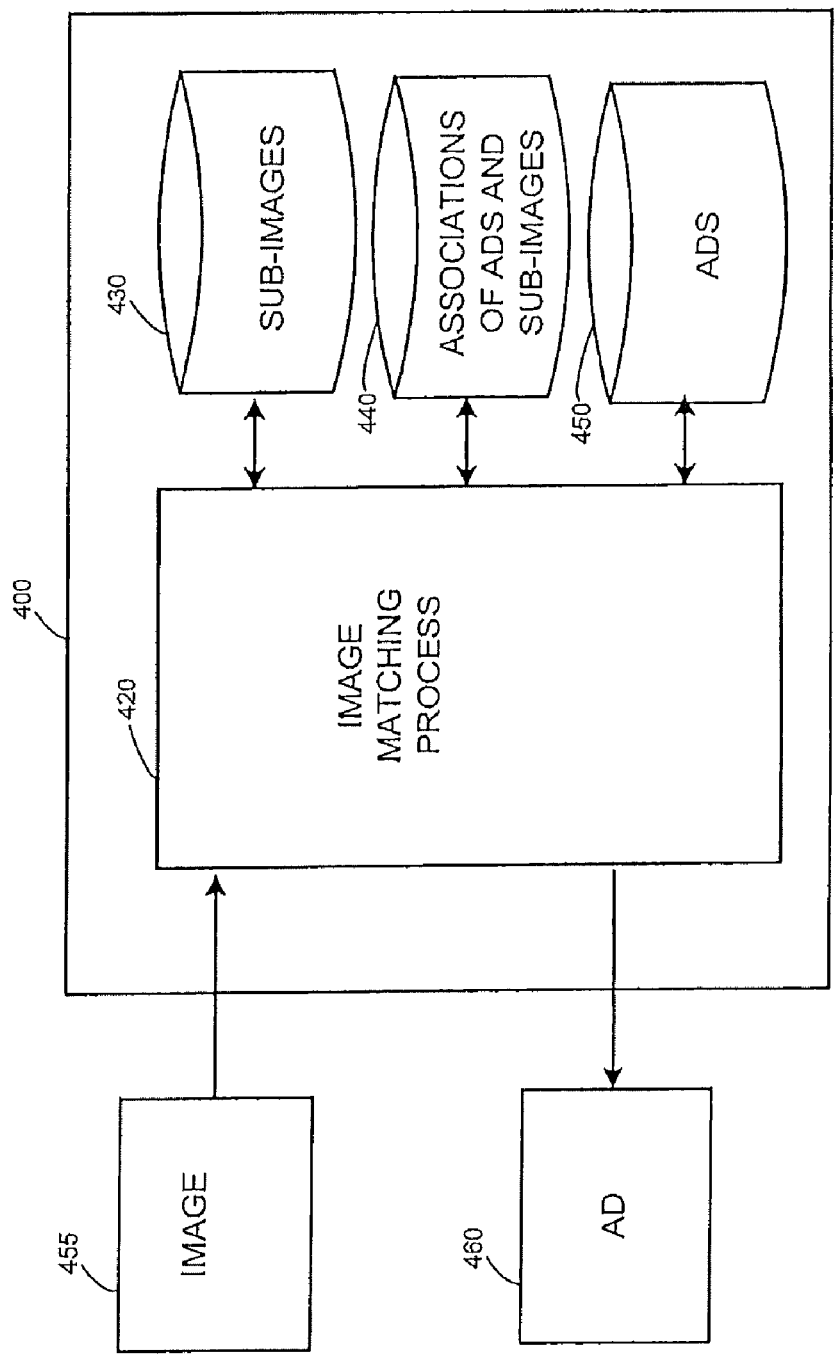
FIG. 4 is a block diagram of an example image-based ad targeting system.

FIG. 4 illustrates an example image-based ad targeting system 400. In the example of FIG. 4, the image-based ad targeting system 400 is a computer system including one or more processors (not shown), software 420 for an executable image matching process, and three persistent data stores: a sub-image data store 430 for storing sub-images, an associations data store 440 for storing associations between ads and sub-images, and an ads data store 450 for storing ads. The data stores 430, 440 and 450 may be one or more databases, a collection of files (such as XML files or a file in any picture storage format, such as .emz, .gif, .jpg or .mpg), or another type of data collection. The ad targeting system 400 is configured to receive an image 455 for which an ad 460 is to identified and execute the matching process 420 that accesses the data stores 430-450 to identify ad 460 based on the received image 455.

Figure 5:
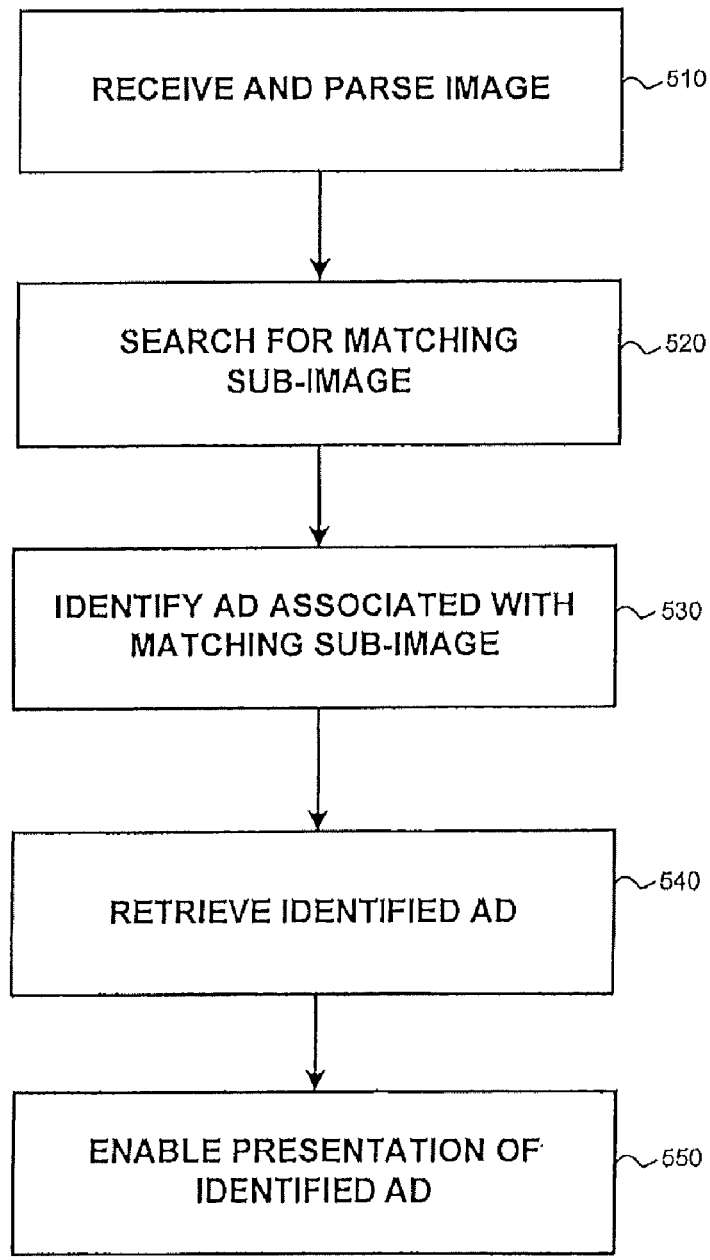
FIGS. 5 and 7 are flow diagrams of example process flows for image-based ad targeting.

Also referring to FIG. 5, a process 500 for matching an ad to an image may be an implementation of image matching process 420 of FIG. 4. The ad targeting system 400 receives and parses the image 455 (510). For example, the ad targeting system 400 may use computer vision techniques to identify a portion of the image 455 to be used for ad targeting. The identified portion of the image 455 may be referred to, for example, as a sub-image, which may be a region-of-interest, a patch, a local feature, or another portion of an image.

The ad targeting system 400 searches the sub-image data store 430 for a sub-image that matches the sub-image parsed from the received image ("parsed sub-image") (520). The ad targeting system 400 identifies, in the association data store 440, an association between the sub-image found in the sub-image data store 430 and an advertisement stored in the ads data store 450 (530). Based on the association between the sub-image in the sub-image data store 430 and the advertisement in the ads data store 450, the ad targeting system 400 retrieves the identified ad from the ads data store 450 and enables presentation of the identified ad (550).

Figure 6:
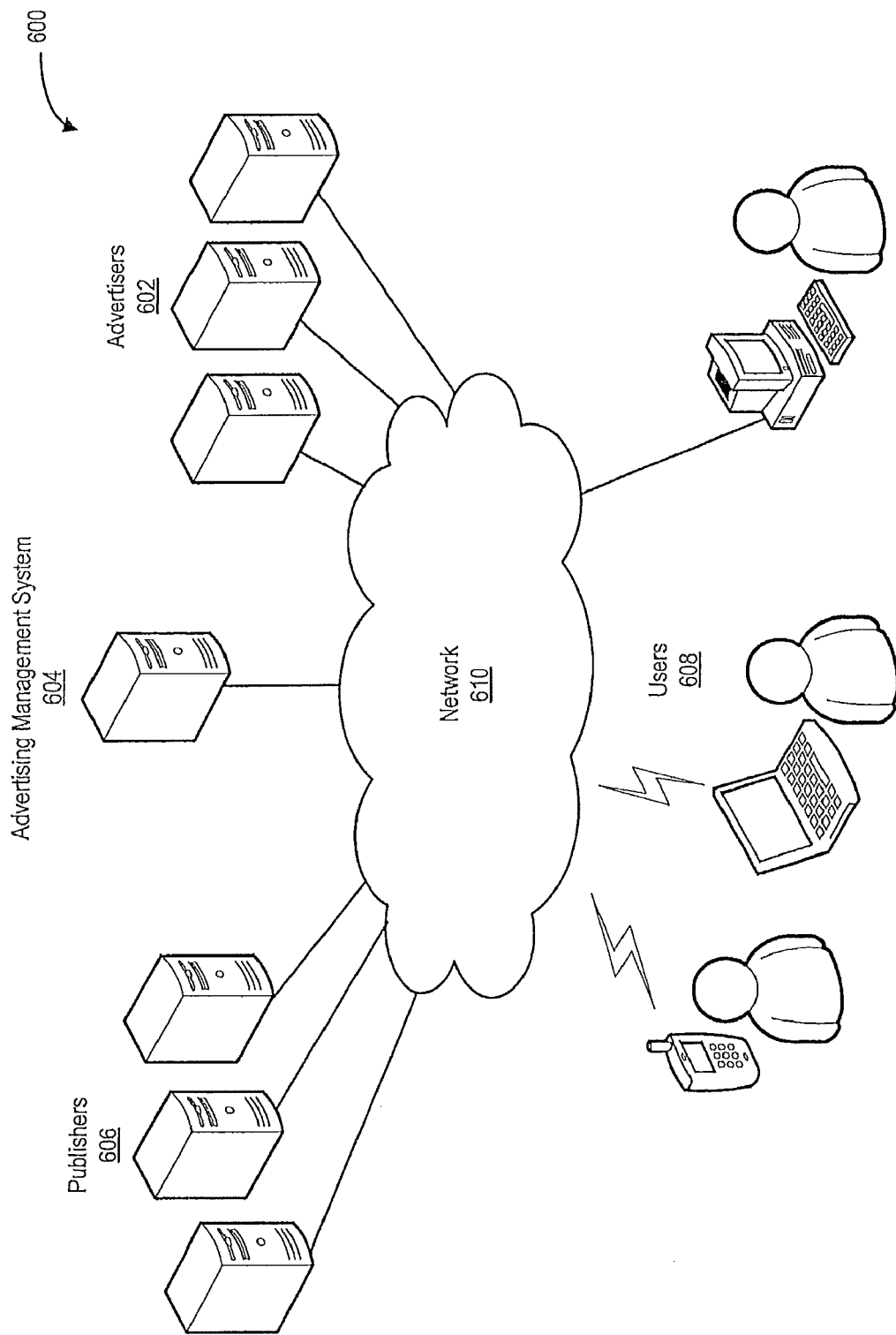
FIG. 6 illustrates an example of an environment for implementing an image-based ad targeting system.

FIG. 6 illustrates an example of an environment 600 for implementing an image-based ad targeting system. In some implementations, one or more advertisers 602 can directly, or indirectly, enter, maintain, and track ad information in an advertising management system 604. The advertising management system 604 may be an implementation of the ad targeting system 400 of FIG. 4. The advertising management system 604 is configured to identify an ad based on an image. The advertising management system 604 is configured to store sub-images used to match a portion of a received image, ads, and associations between ads and sub-images.

The ads may be in the form of graphical ads, such as banner ads, text only ads, image ads, audio ads, video ads, ads combining one of more of any of such components, etc. The ads may also include embedded information, such as a links, meta-information, and/or machine executable instructions. One or more publishers 606 may submit requests for ads to the system 604. The system 604 responds by sending ads to the requesting publisher 606 for placement on one or more of the publisher's media properties (e.g., websites video content, or other content) based on one or more images.

Other entities, such as users 608 and the advertisers 602, can provide usage information to the system 604, such as, for example, whether or not a conversion or click-through related to an ad has occurred. In contrast to an impression which occurs when a user views one of the ads (such as when a page of content including the ad is displayed and/or rendered to the audience member), a "click-through" may be said to occur when a user selects a presented ad by clicking on the ad, embedded hypertext links, executable code, and any type of user selection related to the presented ad, where the click or another type of selection typically directs the user to the advertiser's web site or the advertiser's online or real world presence.

A conversion may be said to occur when a user consummates a transaction related to a previously served ad. What constitutes a conversion may vary from case to case and may be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., a seven days). Many other definitions of what constitutes a conversion are possible.

This usage information can include measured or observed user behavior related to ads that have been served. The system 604 performs financial transactions, such as crediting the publishers 606 and charging the advertisers 602 based on the usage information. The system 604 also may use the usage information, in lieu of or in addition to, impression information to select ads for presentation.

A computer network 610, such as a local area network (LAN), wide area network (WAN), the Internet, or a combination thereof, connects the advertisers 602, the system 604, the publishers 606, and the users 608.

One example of a publisher 606 is a general content server that receives requests for content (e.g., articles, discussion threads, music, video, graphics, search results, web page listings, information feeds, etc.), and retrieves the requested content in response to the request. The content server may submit a request for ads to an advertising management system 604. The ad request may include a number of ads desired. The ad request may also include content request information that identifies an image for which an ad is to be returned. This content request information can include the image itself, a storage location or retrieval mechanism for the image, or another type of information that identifies the image. The content request information also can include identification of content itself (e.g., image, page, video, or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 604. This combined content and ads can be sent to the user 608 that requested the content for presentation in a viewer (e.g., a browser or other content display system). The content server can transmit information about the ads back to the advertising management system, including information describing how, when, and/or where the ads are to be rendered (e.g., in HTML or JavaScript™).

Another example publisher 606 is a search service. A search service can receive queries for search results. In some implementations, the queries may include images. In response to a query, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, hypertext links to those web pages, images, videos, and may be grouped into a predetermined number of (e.g., ten) search results.

The search service can submit a request for ads to the system 604. The request may include, or identify an image to be used for ad targeting. The request may also include a number of ads desired. This number may depend on the search results, the amount of screen or page space occupied by the search results, the size and shape of the ads, etc. In some implementations, the number of desired ads will be from one to ten, or from three to five. The request for ads may also include the query (as entered or parsed), information based on the query (such as geo-location information, whether the query came from an affiliate and an identifier of such an affiliate, or whether the query was an image), and/or information associated with, or based on, the search results. Such information may include, for example, identifiers related to the search results (e.g., document identifiers or "docIDs"), images or videos included in the search results, scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the ads provided by the system 604. This combined information can then forwarded to the user 608 that requested the content. The search results can be maintained as distinct from the ads, so as not to confuse the user between paid advertisements and presumably neutral search results.

Finally, the search service can transmit information about the ad and when, where, and/or how the ad was to be rendered back to the system 604.

As can be appreciated from the foregoing, the advertising management system 604 can serve publishers 606, such as content servers and search services. The system 604 permits serving of ads targeted to documents served by content servers. For example, a network or inter-network may include an advertising management system serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include images, videos, web pages, email, content, embedded information (e.g., embedded media), meta-information and machine executable instructions, and ad spots available. The ads inserted into ad spots in a document can vary each time the document is served or, alternatively, can have a static association with a given document.

Figure 7:
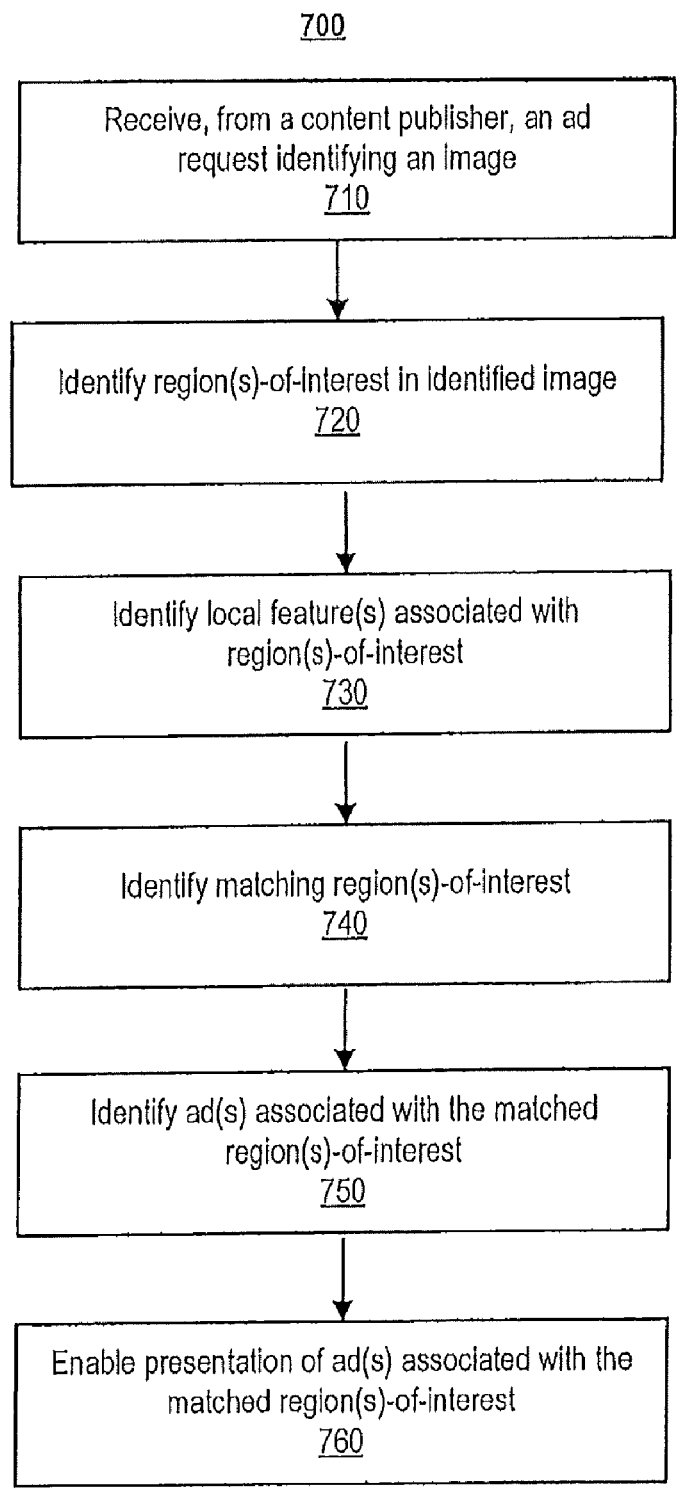

FIG. 7 is a flow diagram of an example process 700 for image-based ad targeting for a content publisher. The process 700 may be executed, for example, by an ad targeting system, such as the ad targeting system 400 of FIG. 4 or the ad management system 604 of FIG. 6. In general, a publisher of a webpage may enroll in an ad syndication program to increase revenue by receiving and displaying ads targeted to content on the webpage. The publisher sends to the ad targeting system a request for ads to be targeted based on an image. For example, an image to be included in the content web page to be displayed may be used to target an ad that is displayed along with the content including the image. The ad targeting system uses the received image to select targeted ads for the webpage. These ads are then returned to the publisher who may combine them with the webpage content, or alternatively, the webpage content may be combined with the ads by ad targeting system and sent directly to a user for whom the content is to be displayed. The steps of process 700 do not have to occur in a specific order and at least some steps can occur in parallel.

Figure 8:
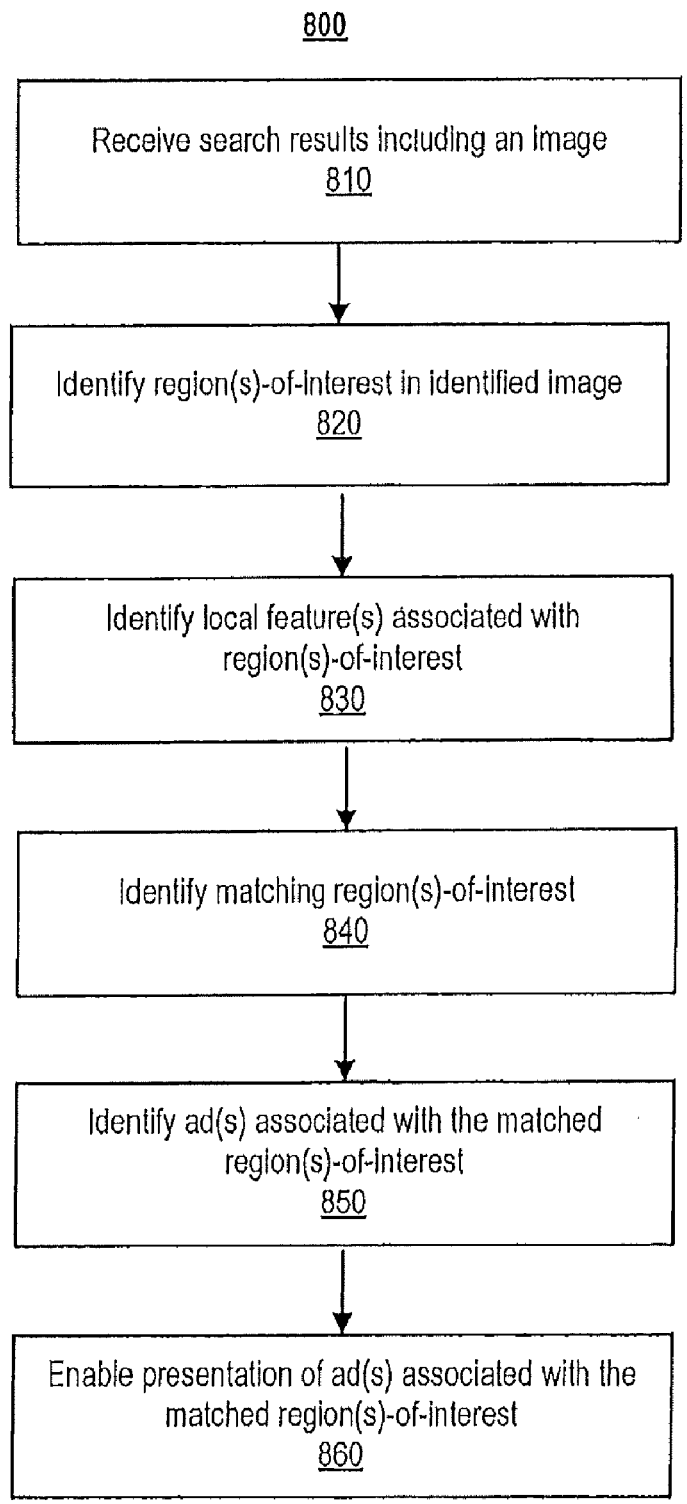
FIG. 8 is a flow diagram of an example process flow for image-based ad targeting.

Referring to FIGS. 7 and 8, and in contrast with the process 500 describe previously with respect to FIG. 5, the ad targeting processes 700 and 800 each match an image for which ads are to be identified (which may be referred to as a received image) to a reference image based on local features. The received image includes one or more regions-of-interest and each of the regions-of-interest includes one or more local features. For example, a received image may include a logo and an image background where the logo is identified as a region-of-interest, which, in turn, includes local features, such as various portions of the logo. The reference image may correspond to the logo (i.e., the reference region-of-interest in this example), which may be decomposed into various local features. In a more particular example, an image may be received that includes the Eiffel Tower. The Eiffel Tower may be identified as a region-of-interest, and the tip of the Eiffel Tower may be identified as one or many local features of the region-of-interest (i.e., the Eiffel Tower in this example).

In general, an ad targeting process may select an ad by matching a target image to a reference image based on identification of the region-of-interest in the target image, decomposing the region-of-interest into local features, matching local features of the target image with reference local features, identifying a reference image corresponding to the reference local features that match the local features of the target image, and identifying an ad associated with the identified reference image. More particularly, the ad targeting process 700 begins when an ad request is received by the ad targeting system from a content publisher, such publisher system 606 of FIG. 6 (710). As described with respect to FIG. 6, the ad request includes context information that is used to select targeted ads. While the content information can include a variety of content types, for the purposes of illustration only, this example describes content information including one or more image files.

The ad targeting system analyzes the received image (here, the image file included in the ad request) to identify one or more regions-of-interest (720). Regions-of-interest are portions, or sections of the image file that are visually distinguishable and stable. Regions-of-interest are visually distinguishable and stable are likely to be, or relate to, the subject or subjects of the image. For example, an image of a chair in a room may be analyzed to identify the chair as a region-of-interest where the background (such as a floor, ceiling and walls of the room in which the chair is depicted) is not included in the region-of-interest. In another example, a chair and a person standing in the room each may be identified as a region-of-interest.

The ad targeting system identifies local features associated with identified region-of-interest(s) (730). In some implementations, local features may be identified for each identified region-of-interest, although not all regions-of-interest need necessarily be decomposed into one or more local features.

The ad targeting system identifies matching regions-of-interest (740). This may be accomplished, for example, by comparing the local features identified for the received or target image with stored local features associated with regions-of-interest. The local features, associations with regions-of-interest, and/or regions-of-interest may be stored in an image repository, such as sub-image data store 430 of FIG. 4, for example. The matching may be performed by computer vision techniques or another type of pattern matching process. For example, image matching may be performed based on image matching techniques described by Patent Cooperative Treaty Patent Application WO 2005/114476 and titled MOBILE IMAGE-BASED INFORMATION RETRIEVAL SYSTEM, which is incorporated in its entirety herein. The image repository may contain regions-of-interest that advertisers have selected, or bid on, to associate with one or more ads, as described more fully later.

The ad targeting system identifies ads corresponding to regions-of-interest in the image repository that indirectly are matched, based on matching local features, to the target regions-of-interest from the received image (750). For example, the ad targeting system may search for an association between an identified sub-image and an ad. In one example, a sub-image may include a pointer, a link, or otherwise identify one or more advertisements to be presented based on the sub-image. In another example, an association data stored, such as associations 440 of FIG. 4, may be searched to identify ad(s) to be presented with the sub-image.

In some implementations, usage information, such as whether or not a conversion or click-through has occurred may be collected, stored and used based on a region-of-interest or sub-image. For example, information for the number of times a region-of-interest or sub-image has been clicked-through by users may be used to determine relevancy of an ad, such as, by weighing a region-of-interest or sub-image based on the number of times the region-of-interest or sub-image.

The ad targeting system enables presentation of the ad(s) associated with the sub-images that match the received image for which ads are to be identified (760). This may be accomplished, for example, by transmitting or otherwise delivering the ad to the requesting publisher system. Alternatively or additionally, the ad targeting system may combine ads with content provided by the publisher system and presented to a user of the publisher system.

FIG. 8 is a flow diagram of another example process 800 for image-based ad targeting. The process 800 may be executed, for example, by an ad targeting system, such as the ad targeting system 400 of FIG. 4 or the ad management system 604 of FIG. 6. The process 800 is performed to provide ads based on search results returned by a search service and, similarly to the process 700 described previously with respect to FIG. 7, decompose an image into one or more regions-of-interest and further decompose one or more regions-of-interest into one or more local features, which, in turn, are used to match reference local features. As described above with respect to FIG. 6, search engine providers may desire to present search results along with ads targeted to the search results. Because images may be presented along with, or as part of search results, ads may be targeted to the images, rather than, or in addition to, ads targeted to the textual search results. The steps of process 800 do not have to occur in a specific order and at least some steps can occur in parallel.

Search results including an image are received (810). For example, a request for ads that includes search results or an image for which ads are to be identified may be received from a provider of a search service. In another example, process 800 may be performed by a search service.

The ad targeting system analyzes the image to identify one or more regions-of-interest (820), identify one or more local features included in one or more regions-of-interest by decomposing a region-of-interest into local features (830), identify matching one or more regions-of-interest based on local features shared by, or similar to, reference local features (840), identify one or more ads associated with one or more of the matched regions-of-interest (850), and enable presentation of the one or more ads associated with the one or more region-of-interest found to match the target image for which ads are to be identified (860). This may be accomplished, for example, by techniques described previously with respect to FIG. 7 (720-750).

Figure 9A:
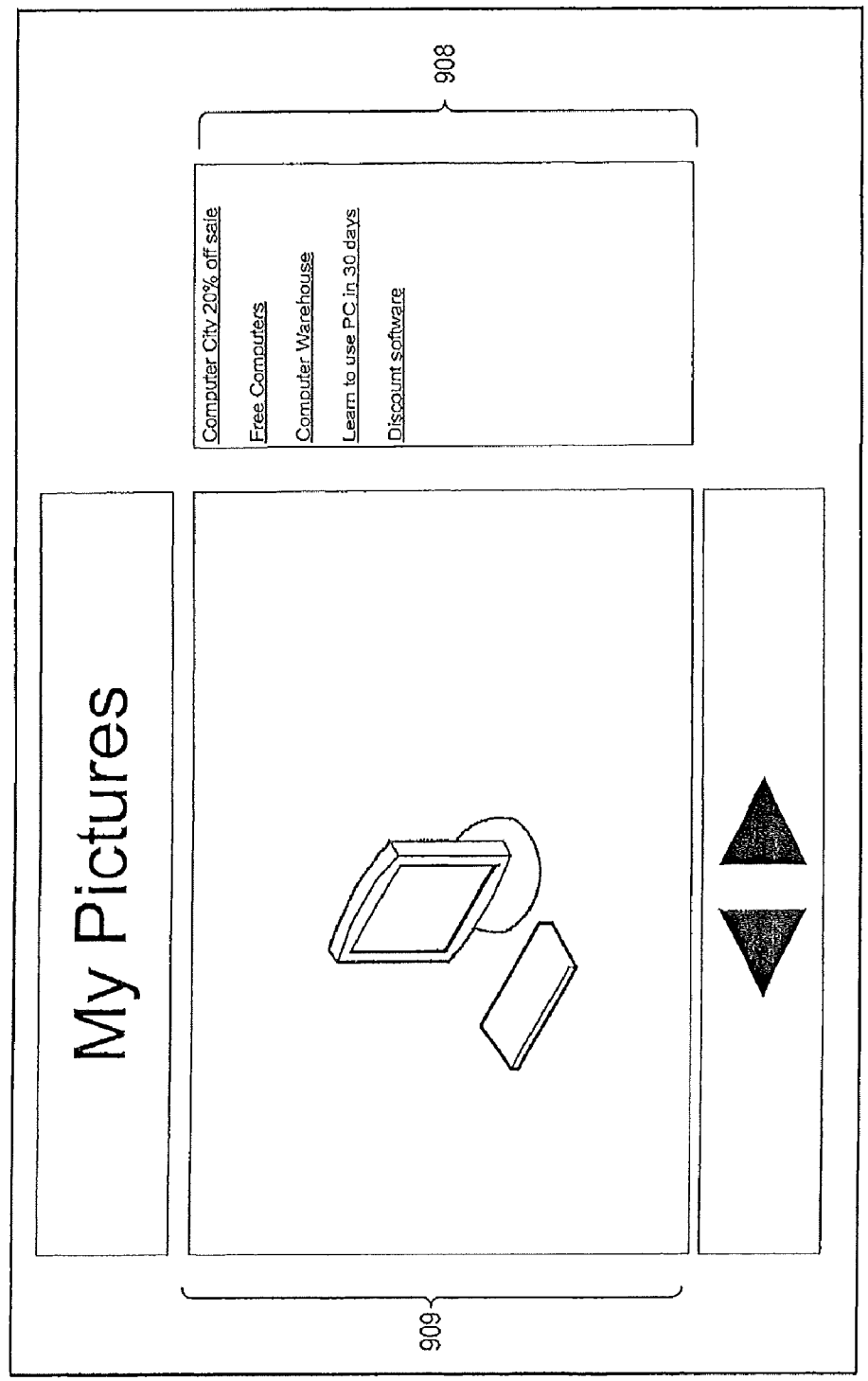
FIGS. 9A and 9B are block diagrams of example user interfaces from an image-based ad targeting system.
Figure 9B:
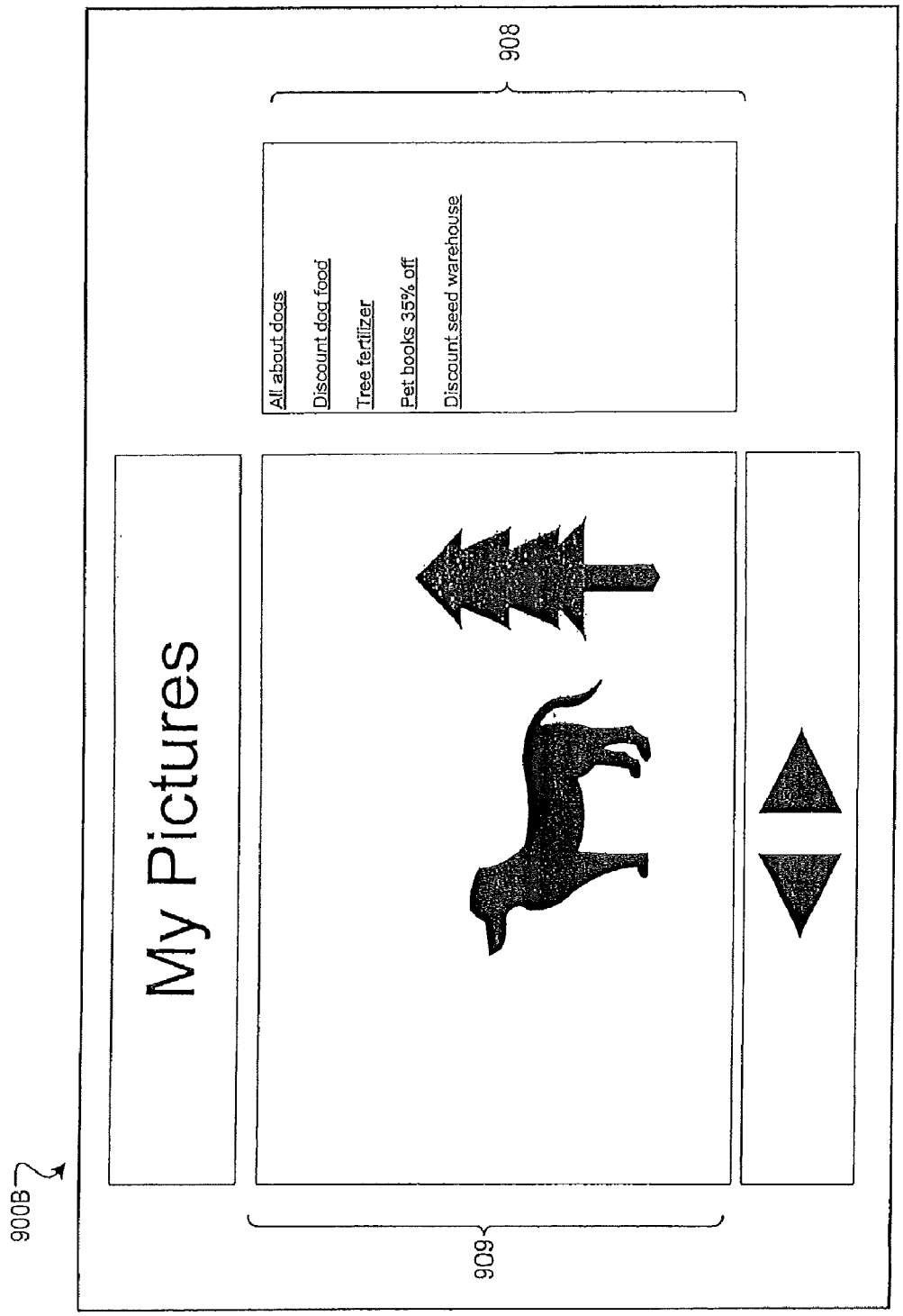

FIGS. 9A and 9B are example user interfaces 900A and 900B that display ads based on images. In the example shown in FIG. 9A, the user interface 900A is from a photography website. The user interface 900A includes a window 404 displaying a photograph of a computer. A publisher of the photography website may be participating in an ad syndication program. The publisher of the photography website requests ads targeted to the contents of the window 904 and presents the targeted ads in the window 908. As described with respect to FIG. 6, when the publisher system generates a webpage including the computer in window 904 for display, a request including the computer image is sent to an ad targeting system. In the example shown in FIG. 9A, the image of the computer displayed in window 904 is sent along with the request for ads to an ad targeting system, such as the ad targeting system 400 of FIG. 4 or the advertising management system 604 of FIG. 6.

As described with respect to FIG. 4, the ad targeting system analyzes the image to identify the sub-image of the computer, identifies a matching sub-image in stored images what that associated with ads, and identifies the ads that are associated with the stored image of a computer found to match the computer image. The ad targeting system, for example, may analyze the image to identify one or more regions-of-interest, decompose one or more regions-of-interest into one or more local features, match the decomposed local features to reference local features to identify a matching reference region-of-interest, which, in turn, is associated with one or more ads to be presented. In some implementations, ads are selected from the identified ads based on advertiser bids. For example, ads that have the highest associated bid are retrieved and returned to the publisher to be provided with the displayed web page.

In the example shown in FIG. 9A, five ads related to the computer image shown in window 904 have been returned and used to populate the window 908. However, any number of targeted ads may be supported. The ads shown in window 908 are hyperlinks to web pages of corresponding advertisers.

Turning to FIG. 9B, a user of the photography website has continued to a different photograph illustrated by the image of the dog and a tree in window 904. As a result, the ads in window 908 have been updated to reflect the change. When the new page was requested by the user a new ad request was made by the publisher to the advertising management system 604. The request included the image of the dog and tree shown in window 904. The image was analyzed to locate regions-of-interest. In this example, there are two regions-of-interest, a dog and a tree. The ad targeting system decomposes both regions-of-interest into local features, which, in turn, are compared with the local features stored in the image database. Ads associated with the regions-of-interest corresponding to local features found to match the target local features were retrieved and used to populate the window 908 according to the amount bid on each image. Because the dog and the tree were identified as regions-of-interest, the ads displayed in the window 908 are both pet and tree related, reflecting the type of ad that may have been associated with an image of a dog or an image of a tree.

Figure 10:
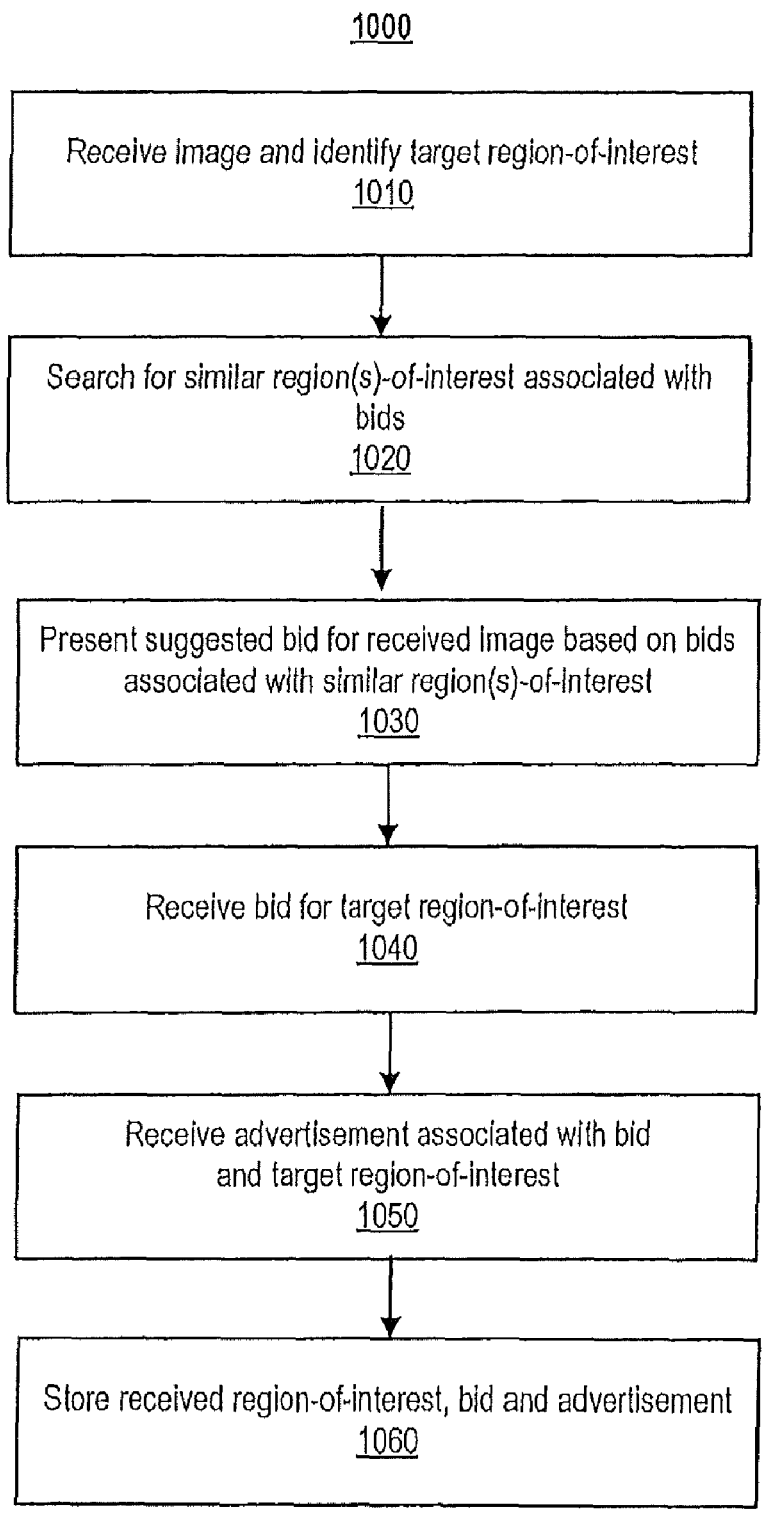
FIG. 10 is a flow diagram of an example process flow for presenting images for bidding for an image with which to present ads.

FIG. 10 depicts an example process 1000 for presenting images for bidding for an image with which to present ads. The example process 1000 is described with respect to a region-of-interest, though different granularities of images may be used. Also, the process 1000 is described with respect to bidding on a single region-of-interest and a single ad, the process 1000 may be used to receive bids for multiple regions-of-interest and/or advertisements. The steps of process 1000 do not have to occur in a specific order and at least some steps can occur in parallel. As described with respect to FIG. 6, advertisers may bid on a particular image in an image database to associate with a desired ad. However, it may be difficult for an advertiser to determine what an appropriate bid for a particular image is or may otherwise desire to know what bids have been placed on similar images. In general, to help establish an appropriate bid, the particular image that an advertiser is interested in may be compared against the database of images to locate similar reference images. Bids associated with these reference images may then be presented to the advertiser as suggested bids.

More particularly, an image-based ad targeting system may present ads based on images and associated bids placed by advertisers. The ad targeting system executing process 1000 receives an image (or indication thereof) on which an advertiser may place a bid (1010). In some implementations, the advertiser may select an image from an a repository of images available to be associated with an ad. For example, an advertiser may wish to have an advertisement for a shoe store appear when a particular shoe image is displayed. The advertiser may browse a repository to locate available images of shoes. When the advertiser has found a suitable shoe image or images the advertiser may select them for bidding.

Additionally or alternatively, an advertiser submit, upload or otherwise provide an image or images to be associated with an ad and a bid. For example, the advertiser may wish to have a particular ad display when an image of the advertiser's logo is displayed. Accordingly, the advertiser may submit one or more images of the logo to be associated with one or more ads. To increase the likelihood of a match, an advertiser may provide more than one images to be matched, and perhaps many more than one. In some instances, an advertiser may provide tens or hundreds of image variations of a logo or product to increase the likelihood of an image of the logo or product being matched.

Further, in some implementations, the advertiser may annotate the image to highlight a desired region-of-interest. Because an image may contain several regions-of-interest that may not be germane to the advertiser's business, the advertiser may wish to specify the particular feature that the advertiser wishes to associate with a desired ad. Continuing the example given above, the advertiser may have one or more images of the desired logo. Many of the images may feature the logo on cars, or t-shirts, or may also include objects that the advertiser is not interested in associating the ad with. Accordingly, the advertiser may annotate the image to point out, highlight or otherwise identify the desired region-of-interest of the image. In some implementations, advertisers may circle, highlight or otherwise identify the desired regions-of-interest on the image using a selection tool included in a user interface, for example.

The ad targeting system searches for one or more similar regions-of-interest associated with bids (1020). For example, the ad targeting system may decompose a region-of-interest and search into one or more local features and search an image repository for reference local features similar to the target local features decomposed from the target region-of-interest. The image repository may be searched for reference local features using image and object recognition techniques, for example. Because the reference local features may not be identical to the decomposed local features, a particular statistical threshold used to locate the reference local features may be lower than the threshold used to match database local features when locating associated advertisements.

In some implementations, the received image (rather than a region-of-interest) may be used to identify local features. Additionally or alternatively, regions-of-interest or another type of sub-image of the received image may be used to identify similar regions-of-interest or sub-images in the repository. In some implementations, regions-of-interest may be categorized or classified to indicate the contents of the image or to generally describe the subject of the image. These categories may be used to locate reference images instead of, or in addition to, searching the image database using image and object recognition techniques as described above.

The ad targeting system presents suggested bid for received image based on bids associated with similar regions-of-interest (1030). For example, the ad targeting system may present the advertiser with the identified reference regions-of-interest along with associated bids. The suggested bid may be computed by averaging the maximum bids of the reference regions-of-interest identified, or using a weighted average of the maximum bids of the reference regions-of-interest where more popular regions-of-interest are given a higher weight, for example. Any number of statistical methods may be used to calculate the suggested bid. The bids may be presented using a user interface 1100 as illustrated by FIG. 11, for example.

The ad targeting system receives from the advertiser a bid to be associated with the received region-of-interest (1040) and identify an advertisement to be presented based on the regions-of-interest (1050). The received region-of-interest, bid and advertisement are stored for later use in identifying an advertisement based on the image (1060). For example, the ad may be stored in the sub-image data store 430, the association may be stored in the associations data store 440 and the ad may be stored in the ads data store 450 of FIG. 4.

In addition, the advertiser may bid on one or more of the presented reference sub-images. The advertiser may provide an additional advertisement to associate with the reference image, or may use the same advertisement used for the desired image.

Figure 11:
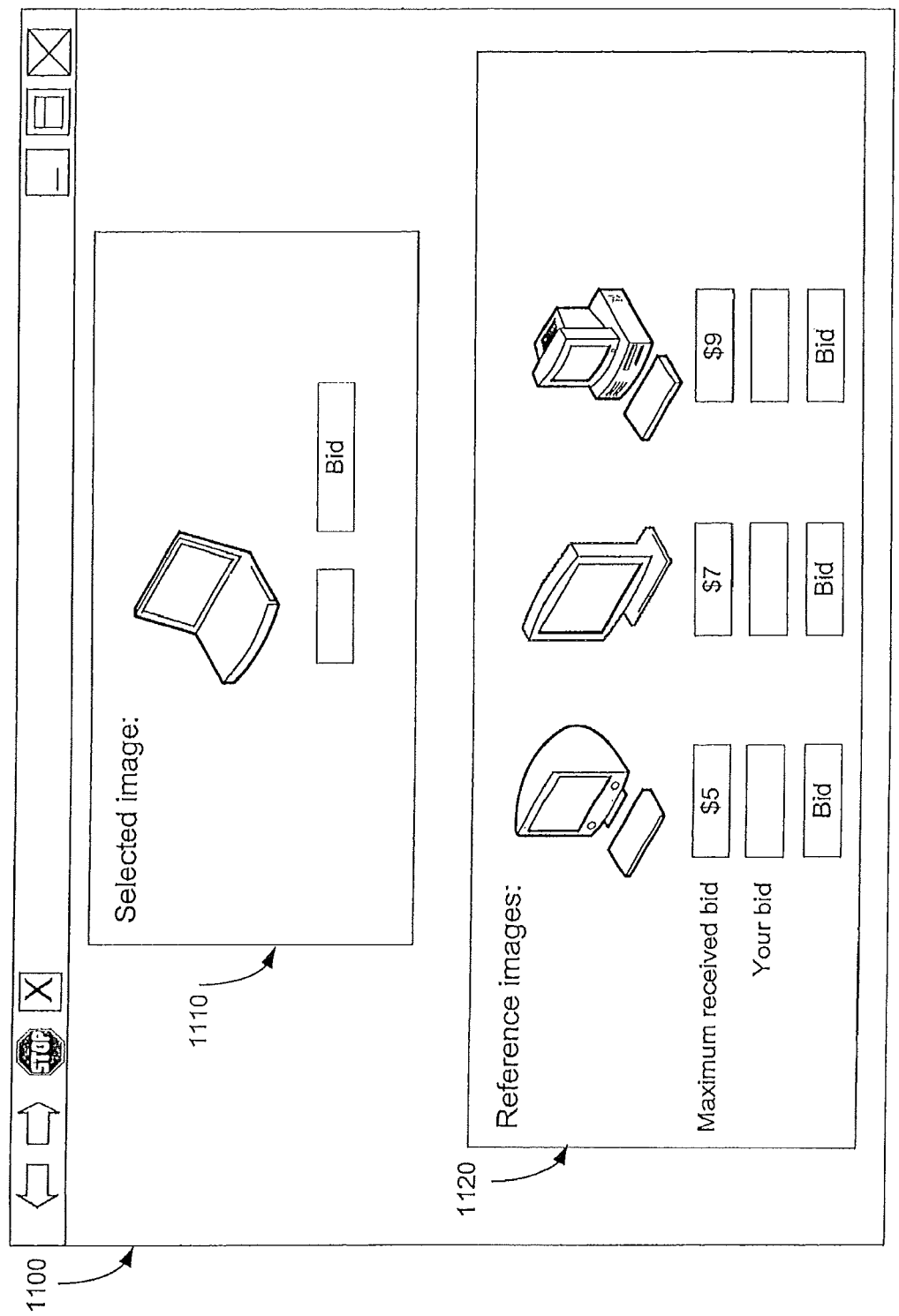
FIG. 11 is a block diagram of an example user interface for bidding in an image-based ad targeting system.

FIG. 11 illustrates an example user interface 1100 for bidding in an image-based ad targeting system. Using the user interface 1100, an advertiser may bid to have an ad or ads associated with a selected image. The associated ad may be presented when the selected image appears in the contents of a webpage or search engine results and the bid is the highest bid or among the highest bids for the image, for example.

An image of a computer to bid on is displayed in image window 1110. In some implementations, the advertiser presents or uploads the image. In other implementations, the advertiser may have selected the image from a repository of images.

The user interface 1100 also displays in reference window 1120 reference images that are identified based on image shown in image window 1110. Each of the reference images in image window 1110 includes an associate maximum bid that have been entered by another advertiser for the reference image, though the reference images need not necessarily be presented with associated bids. As shown in window 1120, three images of computers have been displayed as reference images. The displayed reference images have received maximum bids of five, seven, and nine dollars. The reference images may be determined using object or image recognition techniques to identify reference images with similar features, referencing categories or classifications associated with the images, or a combination of both.

Using the displayed maximum bids as guidance, the advertiser may determine an appropriate bid for the selected image. The advertiser may enter the bid in the text box displayed in window 1110, and submit the entered bid by activating the associated button labeled "Bid", for example.

Further, the user interface 1100 enables an advertiser to make additional bids on one or more of the displayed reference images. After viewing one or more of the reference images displayed in window 1120, the advertiser may place bids on the displayed reference images instead of, or in addition to, the selected image. Accordingly, the advertiser may enter the bids in the text boxes (i.e., labeled "Your bid") underneath each of the reference images in window 1120.

Referring to FIGS. 12-15, techniques described previously with respect to still images may be applied to video to enable presentation of ads associated with an image presented in video content. Video content may include multiple frames, with each frame including an image which are displayed in rapid succession to create the illusion of motion to a viewer.

Figure 12:
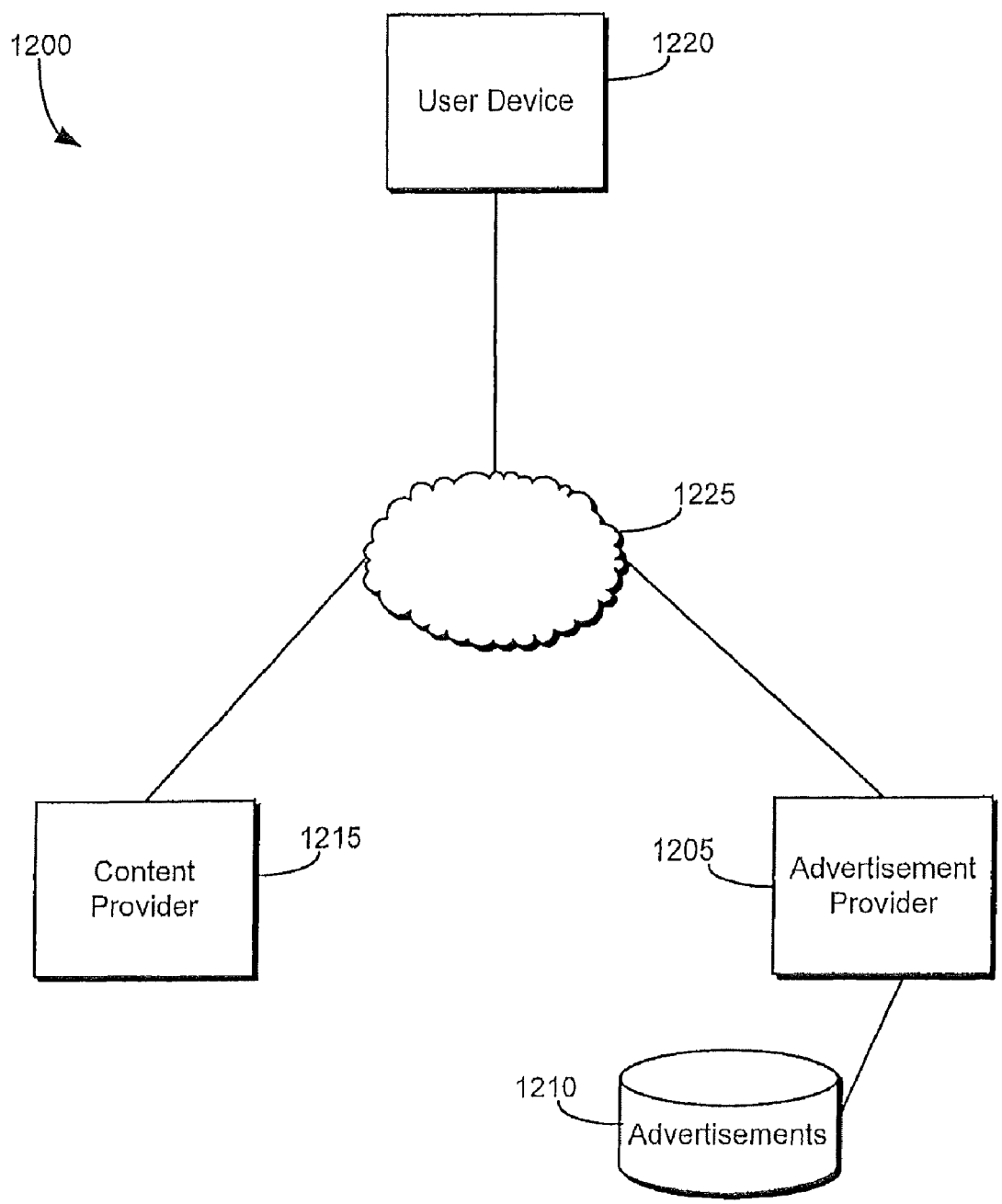
FIG. 12 illustrates an example of an environment for providing advertisements for video content items.

FIG. 12 shows an example of an environment 1200 for providing advertisements for video content items. A "video content item" is an item of content that includes content that may be perceived visually when played, rendered, or decoded. A video content item includes video data, and optionally audio data and metadata. Video data includes content in the video content item that may be perceived visually when the video content item is played, rendered, or decoded. Audio data includes content in the video content item that may be perceived aurally when the video content item is played, decoded, or rendered. A video content item may include video data and any accompanying audio data regardless of whether or not the video content item is ultimately stored on a tangible medium. A video content item may include, for example, a live or recorded television program, a live or recorded theatrical or dramatic work, a music video, a televised event (e.g., a sports event, a political event, a news event, etc.), video voicemail, etc. Each of different forms or formats of the same video data and accompanying audio data (e.g., original, compressed, packetized, streamed, etc.) may be considered to be a video content item (e.g., the same video content item, or different video content items).

A video content item may also include many types of associated data. Examples of types of associated data include video data, audio data, closed-caption or subtitle data, a transcript, content descriptions (e.g., title, actor list, genre information, first performance or release date, etc.), related still images, user-supplied tags and ratings, etc. Some of this data, such as the description, may refer to the entire video content item, while other data (e.g., the closed-caption data) may be temporally-based or time-coded.

The environment 1200 includes, or is communicably coupled with, an advertisement provider system 1205 (having access to advertisement repository 1210), a content provider system 1215, and one or more user devices 1220, at least some of which communicate across network 1225. In general, the advertisement provider system 1205 may provide relevant advertising content ("ad content") or other relevant content to a video content item. The advertisement provider system 1205 may be an implementation of the advertising management system 604 of FIG. 6. By way of example, reference is made to delivering ad content, though other forms of content (e.g., other content item types) may be delivered. The presented content may be provided by the content provider system 1215 through the network 1225. The ad content may be distributed, through network 1225, to one or more user devices 1220 before, during, or after presentation of the material. In some implementations, advertisement provider system 1205 may be coupled with an advertising repository 1210. The ad repository stores advertisements that may be presented with various types of content, including audio and/or video content. The selection of advertisements for presentment with the video content item is determined based on images. For example, an ad may be targeted for presentation in a video content item based on an image in one or more frames of the video content item.

Video content may be consumed at various client locations, using various devices. Examples of the various devices include customer premises equipment which is used at a residence or place of business (e.g., computers, video players, video-capable game consoles, televisions or television set-top boxes, etc.), a mobile telephone with video functionality, a video player, a laptop computer, a set top box, a game console, a car video player, etc. Video content may be transmitted from various sources including, for example, terrestrial television (or data) transmission stations, cable television (or data) transmission stations, satellite television (or data) transmission stations, via satellites, and video content servers (e.g., Webcasting servers, podcasting servers, video streaming servers, video download Websites, etc.), via a network such as the Internet for example, and a video phone service provider network such as the Public Switched Telephone Network ("PSTN") and the Internet, for example.

Ad content may include text, graphics, still-images, video, audio, audio and video, banners, links (such as advertising providing a hyperlink to an advertiser's website), and other web or television programming related data. As such, ad content may be formatted differently, based on whether the ad content is primarily directed to websites, media players, email, television programs, closed captioning, etc. For example, ad content directed to a website may be formatted for display in a frame within a web browser. In other examples, ad content may be delivered in an RSS (Real Simple Syndication) feed, or ad content may be delivered relative to a radio item (such as before, during or after a radio item). As yet another example, ad content directed to a video player may be presented "in-stream" as video content is played in the video player. In some implementations, in-stream ad content may replace the video or audio content in a video or audio player for some period of time or may be inserted between portions of the video or audio content. An in-stream advertisement may include video, audio, text, animated images, still images, or some combination thereof.

The content provider system 1215 may present video content to users (e.g., user device 1220) through the network 1225. The content provider system 1215 may be an implementation of the publisher system 606 of FIG. 6. In some implementations, the content provider system 1215 may include web servers where the content includes webpages or other content written in the Hypertext Markup Language (HTML), or any language suitable for authoring webpages. In general, content provider system 1215 may include users, web publishers, and other entities capable of distributing video content over a network. For example, a web publisher may post a video file on a publicly available web server for download and playing by other users. In some implementations, the content provider system 1215 may make the content accessible through a known Uniform Resource Locator (URL).

The content provider system 1215 may receive requests for video content. The content provider system 1215 may retrieve the requested video content in response to, or otherwise service, the request. The content provider system 1215 may broadcast video content as well (e.g., providing content though not necessarily responsive to a request).

Content provided by content provider system 1215 may include news, weather, entertainment, or other consumable textual, audio, or video media. More particularly, the content may include various resources, such as documents (e.g., webpages, plain text documents, Portable Document Format (PDF) documents, and images), video or audio clips, etc. In some implementations, the content may be graphic-intensive, media-rich data, such as, for example, Flash-based content that presents video and sound media.

The environment 1200 includes one or more user devices 1220. The user device 1220 may include a desktop computer, laptop computer, a media player (e.g., an MP3 player, a streaming audio player, a streaming video player, a television, a computer, a mobile device, a DVD player, etc.), a mobile phone, a browser facility (e.g., a web browser application), an e-mail facility, telephony means, a set top box, a television device, a radio device or other device that may access advertisements and other content via network 1225. One or more of the user devices 1220 may be implementations of user devices 608 of FIG. 6. The content provider system 1215 may permit user device 1220 to access content (e.g., video files for downloading or streaming).

The network 1225 facilitates wireless or wireline communication between the advertisement provider system 1205, the content provider system 1215, and any other local or remote computers (e.g., user device 1220). The network 1225 may be all or a portion of an enterprise or secured network. In another example, the network 1225 may be a virtual private network (VPN) between the content provider system 1215 and the user device 1220 across a wireline or a wireless link. While illustrated as a single or continuous network, the network 1225 may be logically divided into various sub-nets or virtual networks without departing from the scope of this disclosure, so long as at least a portion of the network 1225 may facilitate communications between the advertisement provider system 1205, content provider system 1215, and at least one client (e.g., user device 1220). In certain implementations, the network 1225 may be a secure network associated with the enterprise and certain local or remote clients 1220.

Examples of network 1225 include a local area network (LAN), a wide area network (WAN), a wireless phone network, a Wi-Fi network, a WiMax network, a broadband network, and the Internet.

In some implementations, a video content item is combined with one or more of the ads provided by the advertisement provider system 1205, for example, based on an image appearing in the video content item. This combined information including the content of the content item and ad(s) is then forwarded toward a user device 1220 that requested the content item or that configured itself to receive the content item, for presentation to a user.

The content provider system 1215 may transmit information about the ads and how, where or when the ads are to be rendered based on an image in the video content item back to the advertisement provider system 1205 through the network 1225. Alternatively, or in addition, such information may be provided back to the advertisement provider system 1205 by some other means.

In some implementations, the content provider system 1215 includes advertisement media as well as other content. In such a case, the advertisement provider system 1205 may determine and inform the content provider system 1215 which advertisements to send to the user device 1220, for example.

Figure 13:
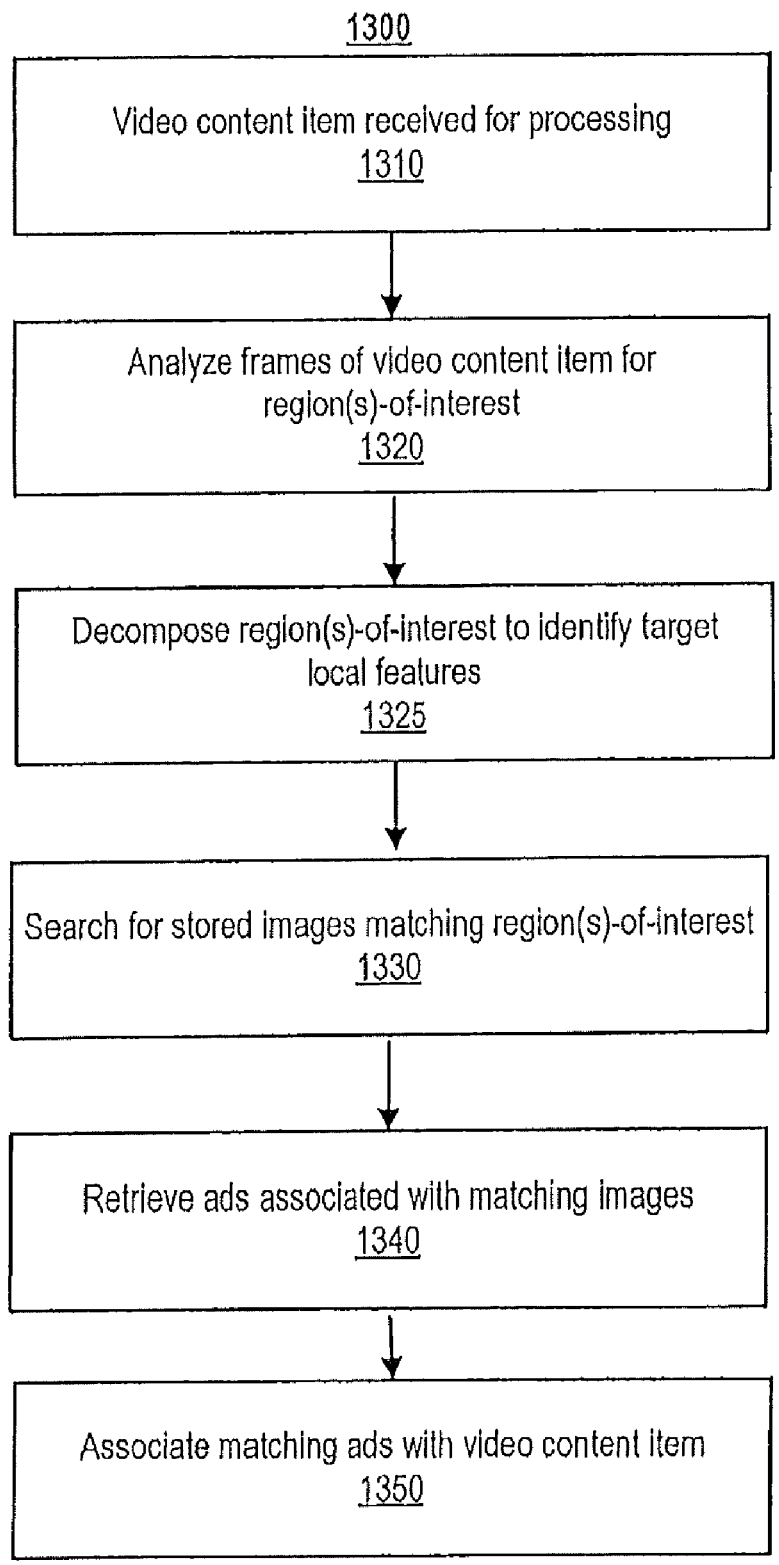
FIG. 13 is a flow diagram of an example process flow for preprocessing video content items for images and retrieving associated ads.

More particularly, FIG. 13 is an example process 1300 for processing video content items for images and retrieving associated ads. In some implementations, the process 1300 may be performed such that the video content item is preprocessed to associate ads with images prior to enabling viewing of the video. Additionally or alternatively, the process 1300 may be used to identify ads based on images in the video while the video is being viewed or streamed for viewing. In some implementations, the video content item may be preprocessed to identify images in the video content item and the ads may be associated with the images at a later time, such as while the video is being viewed or streamed for viewing. The steps of process 1300 do not have to occur in a specific order and at least some steps can occur in parallel.

A video content item is received for processing (1310). The video content item may be preprocessed to locate images in the various frames that may have associated advertisements. Alternatively or additionally, the video content item may be processed as the video is being viewed or streamed for viewing. As described above, a user or advertiser may have id to have an ad displayed with a particular image. It may be desirable to also display the ad when the image, or a similar image, appears in a video content item. The ad may be displayed in the same window as the video content item, or may be displayed in a separate window.

The frames of the video content item are analyzed to find regions-of-interest (1320). In some implementations, each frame of the video content item is analyzed to identify regions-of-interest. Alternatively, because video content items may contain a large number of frames for each second of video content, and regions-of-interest typically remain visible in a video content item for one or more seconds, some sampling rate may be chosen for frame analysis. For example, every 24 frames may be selected for analysis.

The identified regions-of-interest are decomposed into local features (1325), which are used to search against the reference local features associated with one or more regions-of-interest (1330). The target local features images may be matched against, reference local features using image or object recognition techniques. A local feature may be considered a match, if the one or more identified local features match with a confidence level greater than a selected threshold, for example. Stored one or more region(s)-of-interest that match local features are identified, and the ads associated with the one or more regions-of-interest are retrieved (1340).

The retrieved ads are associated with the video content item (1350). The ads may be associated with the video content item such that when a frame of the video content item is displayed that contains one or more images with associated ads, the ads are retrieved and displayed at the same time that the video content item is played. The ads may be displayed in an overlay on top of a media player currently processing the video content item, or in a separate window, for example.

In some implementations, the ads or references to the ads may be embedded into the video content item and decoded or retrieved by a media player capable of recognizing the embedded ads. In other implementations, the ads or references to the ads may be stared in a separate file that indicates where and how the ads may be presented to the user during video content item playback.

Figure 14:
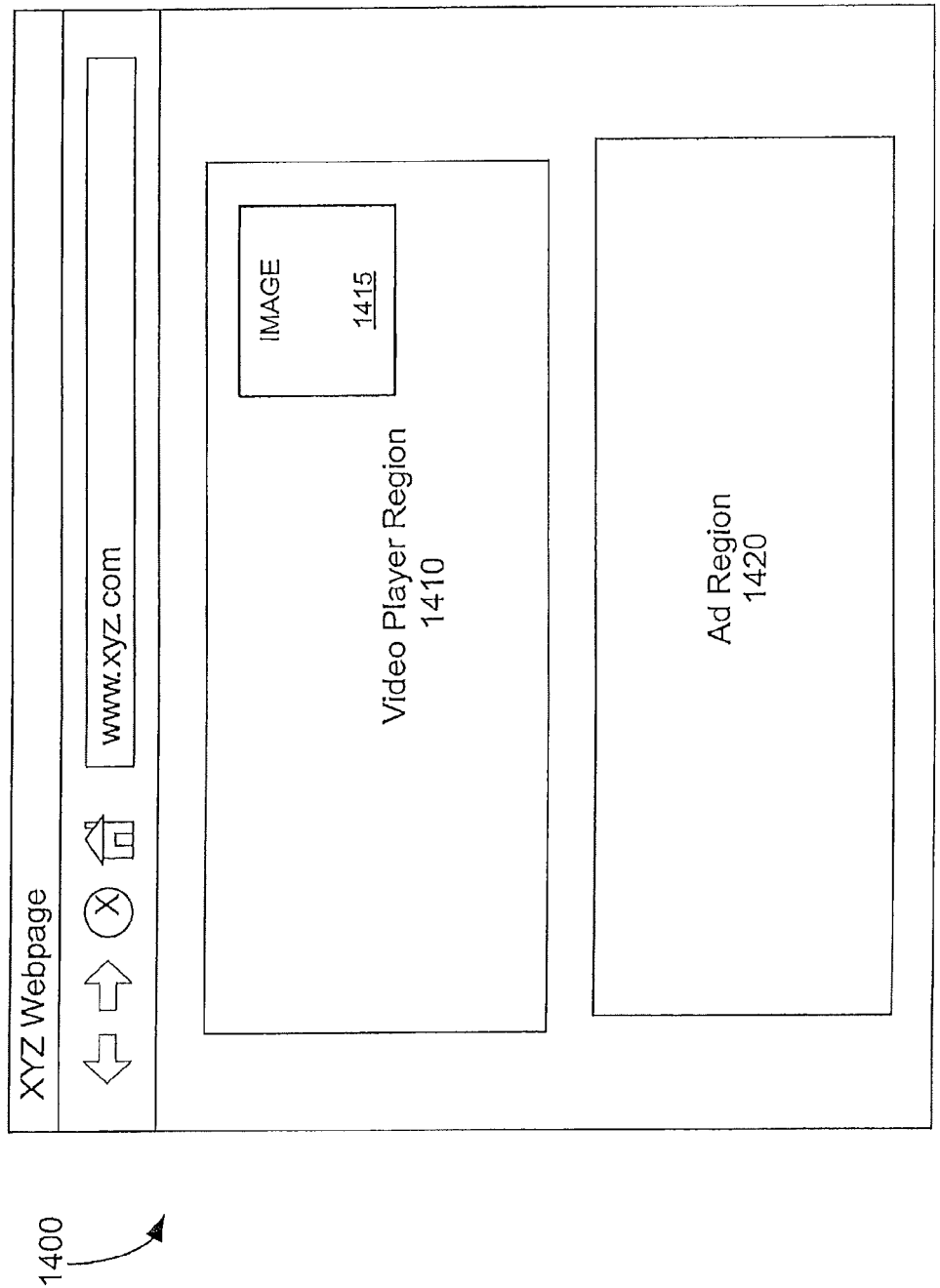
FIGS. 14 and 16 are block diagrams of example user interfaces illustrating advertising content displayed on a screen with video content.

FIG. 14 is an example user interface 1400 illustrating advertising content displayed on a screen with video content where the displayed ads are based on an image. The user interface 1400 illustrates an example web browser user interface. However, the content shown in the user interface 1400 can be presented in a webpage, an MP3 player, a streaming audio player, a streaming video player, a television, a computer, a mobile device, etc. The content shown in the user interface 1400 may be provided by an advertisement provider 1205, a content provider 1215, another networked device, or some combination of those providers.

As shown, the user interface 1400 includes a video player region 1410 including an image 1415 on which an ad presented in ad region 1420 is based. The video display region 1410 may include a media player for presenting text, images, video, or audio, or any combination thereof. The ad region 1420 displays advertisements (e.g., banner ads, flash-based video/audio ads, scrolling ads, etc.) based on an image shown in the video player region. The ad displayed in ad region 1420 may be associated with an image in the video player region 1410, for example, based on the process 1300 of FIG. 13.

Figure 15:
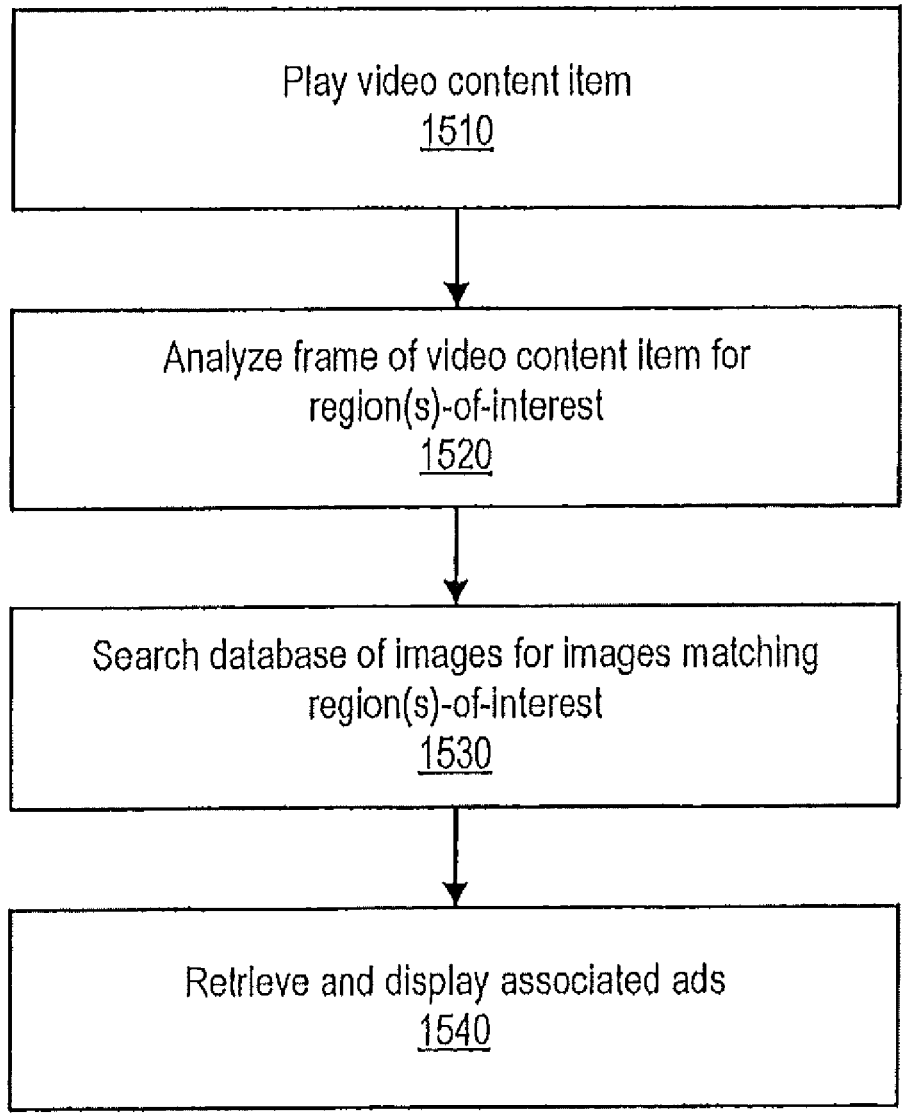
FIG. 15 is a flow diagram of an example process flow for retrieving ads associated with images in a video content item.

FIG. 15 is an example process 1500 for retrieving ads associated with images in a video content item. For example, the process 1500 may be used to present ads in ad region 1320 of FIG. 13. In addition to or in lieu of preprocessing a video content item as described above with respect to process 1300 of FIG. 13, the frames of the video content item may be analyzed for images with associated ads as the video frames are presented. The steps of process 1500 do not have to occur in a specific order and at least some steps can occur in parallel.

A video content item is played for viewing (1510). For example, a video content item may be played on a media player and the video content item may be displayed, for example, in a video player region, such as region 1410 of FIG. 14. In some implementations, a buffer may be utilized to allow some time for the processing of the video content item frame and the retrieval and display of the associated ads. The particular size of the buffer may vary depending on the resources of the computer performing the processing, and other factors such as the complexity of the video content item frame, and the rate at which the video frames are processed.

A selected, or current, frame of the video content item is analyzed for one or more region(s)-of-interest (1520). The frame may be selected from a buffer or frame queue. Each frame in the video content item may be analyzed, or some sampling rate may be selected for the video content item, to reduce the number of frames that are analyzed, such as every 24 frames for example. The particular sampling rate chosen may be a function of the available computing resources, for example. Further, the sampling rate may be dynamic and change depending upon how many frames are in the buffer, or the number of local features being located.

In some implementations, a current video content item frame may be compared with a previously analyzed video content item frame to determine relative differences between before analyzing the current frame. Because video content items frames are often very similar to proceeding video content item frames, the identified local features in the two frames may be identical or near identical. Thus, processing resources may be saved by determining the relative similarities or differences between two frames using a relatively low computationally intensive comparison process before undertaking the high computationally intensive process of locating local features and matching them against stored images. If a frame is statistically similar enough to a previously analyzed frame it can be assigned the same local features as the previous frame, for example.

The identified one or more region(s)-of-interest are used to search a database of images (1530). A region-of-interest may be decomposed to identify target local features, which are compared against the reference local features using object recognition techniques, for example.

Ads associated with any matching region-of-interest are retrieved and displayed along with the current video frame in video content item (1540). In some implementations, the ads are displayed in a window separate from the window displaying the video content item, such as illustrated in ad region 1420 and video player region 1410 of FIG. 14. Additionally or alternatively, the ads may be displayed on or near the associated regions-of-interest in the current frame of the video stream in an overlay, for example.

Figure 16:
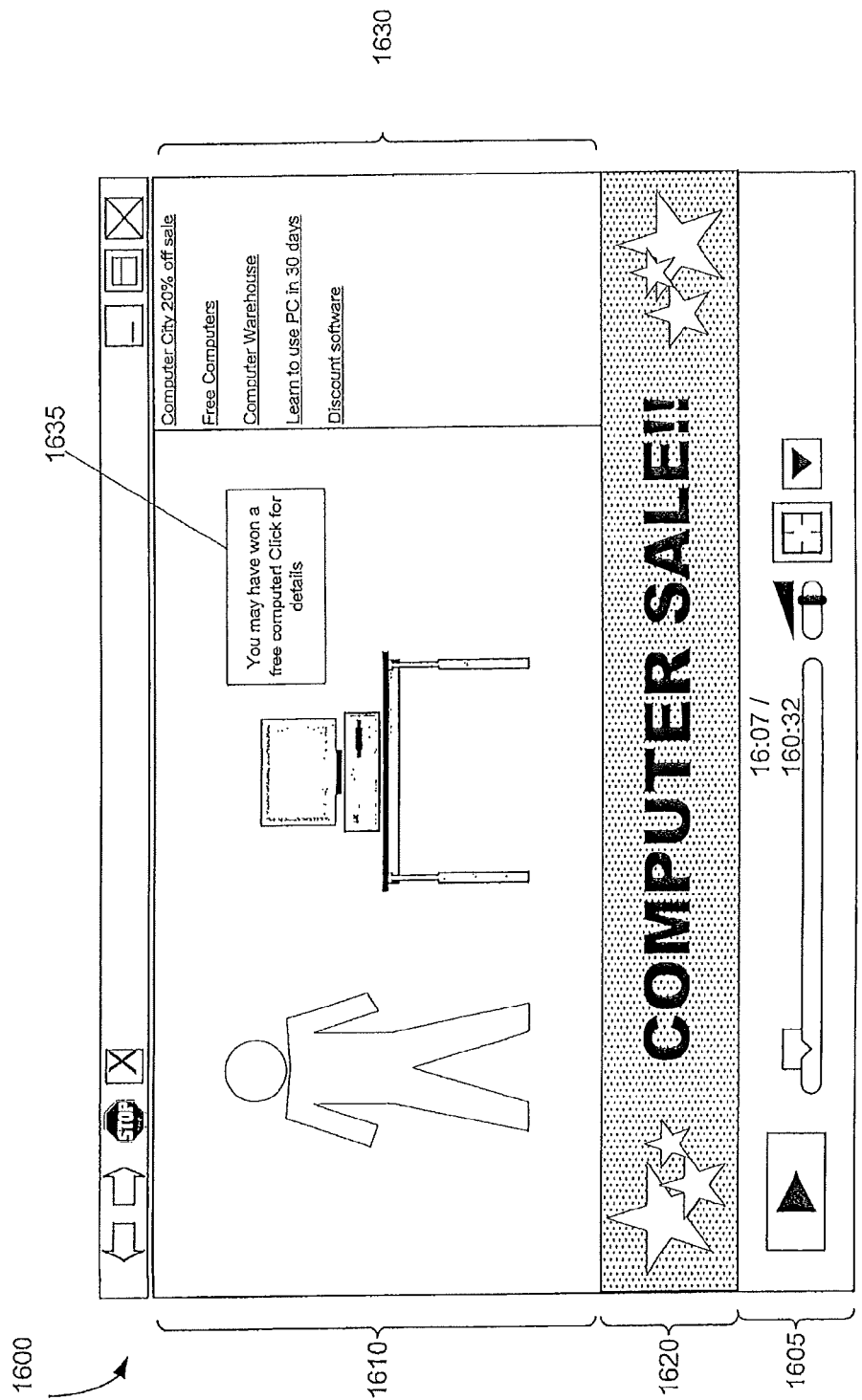

FIG. 16 depicts an example user interface 1600 for providing ads associated with images in a video content item. The user interface 1600 includes media control window 1605 that may contain the various icons that are used to control the playback of a video content item.

The user interface 1600 also includes a video content region 1610 where frames of a currently playing video content are displayed. In some implementations, the region 1610 may also display ads associated with one or more images displayed in a current frame of the video content item. As illustrated, the ads are displayed in ad regions 1620 and 1630, each of which are separate from the region 1610 so as to not interfere with viewing of the video content item.

In the example shown in FIG. 16, a video content item is being played in the user interface 1600. The current frame of the video content item is shown in the region 1610 and shows a man standing next to a personal computer.

As described with respect to FIG. 14, the displayed frame in the video content item is analyzed for regions-of-interest. The regions-of-interest are decomposed to identify local features, which are used to query a database of reference local features corresponding to reference regions-of-interest associated with ads. Ads associated with matching regions-of-interest are displayed along with the current video content item frame.

In the example shown in FIG. 16, the regions-of-interest of a computer and a man. Various ads related to the computer image are shown in ad regions 1620 and 1630. Ad region 1620 shows a banner ad, whereas ad region 1630 includes hyperlink ads by which web pages of corresponding advertisers may be accessed. Similarly, the box 1635 displays an ad inside the current frame of the video content item. In the example of user interface 1600, no ads were displayed related to the man sub-image displayed in video region 1610.

Figure 17:
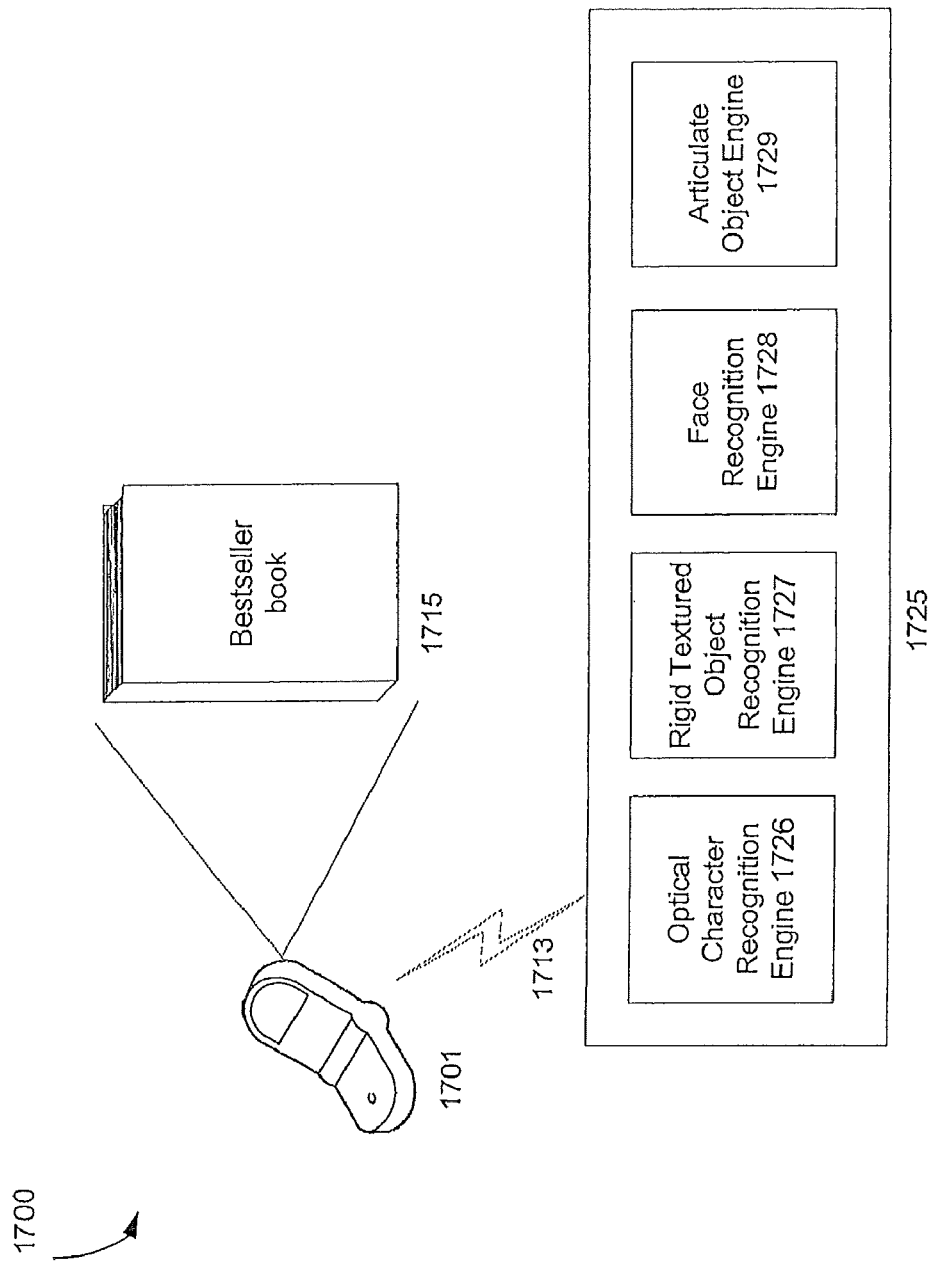
FIG. 17 shows an example environment for the presentation of advertisements associated with a digital photograph.

FIG. 17 shows an example environment 1700 for the presentation of advertisements associated with a digital photograph. In general the environment 1700 allows a user to submit a digital photograph from a user device and in return receive advertisements related to the submitted photograph as well as well as other non-advertisement content such as search engine results, for example.

More particularly, the environment 1700 includes a user device 1701 adapted to take a digital photograph and submit it to a server 1725 via a network 1713. The server 1725 is adapted to receive the digital photograph through the network 1713, analyze the image to identify one or more stored matching representations of objects that have associated advertisements, and provide the associated advertisements, and other content, to the user device 1701 via the network 1713.

The user device 1701 may comprise a mobile phone capable of taking digital photographs. However, the user device 1701 is not limited to mobile phones, and may comprise any device capable of taking digital pictures including, but not limited to, a personal digital assistant, a smart phone, a laptop computer, a digital camera, a portable media player, and a portable video game console, for example.

In the example shown in FIG. 17, a user of the user device 1701 takes a picture of an object 1715 (here, a book) for which the user or operator of the user device 1701 would like to receive additional information. The object 1715 may including anything capable of being photographed including people, automobiles, buildings, products, advertisements, text, etc. For example, a user may take a photograph of an automobile, an advertisement or a billboard featuring a movie, a restaurant or a hotel about which the user desires more information.

The digital photograph is transmitted by the user device 1701 to the server 1725. The user device 1701 and the server 1725 are wirelessly connected through a network 1713. The network 1713 may comprise a variety of networks including, but not limited to, a public network (e.g., the internee), a private network (e.g., corporate LAN), and cellular telephone network (e.g., CDMA, GSM, 2G, 2.5G and 3G).

The server 1725 receives the image of the object and compares the image of the object to stored representations of objects using a variety of object recognition techniques. In the example shown, the server 1725 may compare the received image of the book with one or more stored representations of objects using various object, recognition techniques. Because different object recognition systems or engines are often suitable for different object types, it may be desirable to process the received image with a variety of object recognition engines. For example, certain characteristics and assumptions about a human face may be utilized by a face recognition engine to improve performance. However, those assumptions may not apply to the recognition of rigid textured objects, such as a building, for example. Thus, the server 1725 may compare the received image with the stored representations of objects using a variety of object recognition engines. These engines may include: an optical character recognition engine 1726; a rigid textured object recognition engine 1727; a face recognition engine 1728; and an articulate object recognition engine 1729. The particular object recognition engines used are discussed further in U.S. Patent Application No. 61/129, 034, titled "Image-based Search Engine for Mobile Phones With Camera." The contents of the application are hereby incorporated by reference in its entirety.

The server 1725 may further retrieve any advertisements associated with the matching representation of an object. In the example shown, an advertiser, such as a book store owner or a book publisher, may have bid to have an advertisement associated with the book object 1715. The advertisement may be combined with search engine results or other non-advertisement content produced in response to receiving the image and returned to the user device 1701, for example.

In this manner, a person may receive advertisements or information about objects by sending an image of an object to an information retrieval system.

Figure 18:
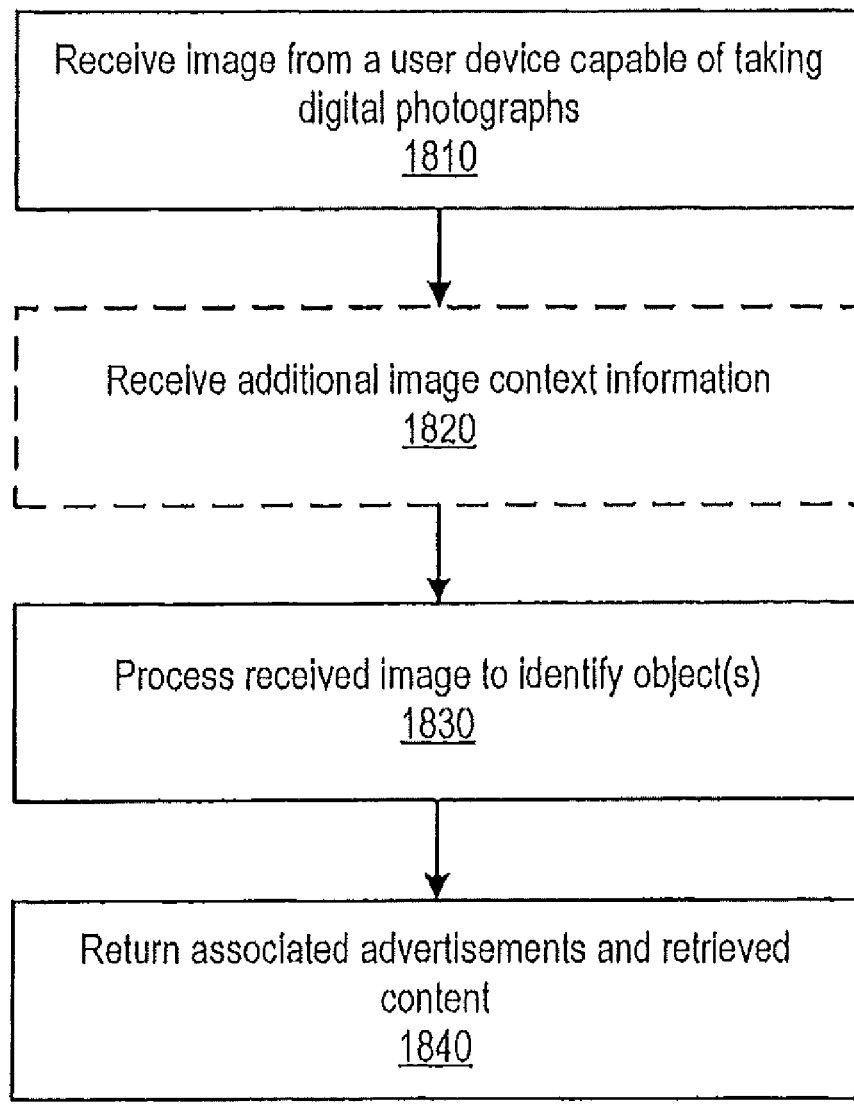
FIG. 18 is a flow diagram of an example process flow for the presentation of advertisements associated with a digital photograph.

FIG. 18 is a flow diagram of an example process flow 1800 for the presentation of advertisements associated with a digital photograph. The steps of process 6100 do not have to occur in a specific order and at least some steps can occur in parallel.

An image is received from a user device capable of taking digital photographs (1810). The user device may be any device capable of taking digital pictures, such as a mobile phone, a digital camera, or a portable media device. In one example, a user of a mobile phone may have taken a digital image of a particular object about which more information is desired.

Additional image content information may be optionally received (1820). For example, additional classification data may be received from the user device. This additional, data may allow the object recognition engines that process the received image to narrow the number of objects that are searched or provide more accurate results. In some implementations the additional data may be user supplied. The user may be prompted after taking the image to select a general category for the image or provide a description. For example, after taking a picture of a restaurant, the user may indicate that that the picture is of a restaurant. This additional data may allow the object recognition engines to narrow the objects that are searched to those objects associated with restaurants.

In some implementations, the additional data may be automatically supplied by the user device. For example, where the user device is equipped with a global positioning system, the user device may provide the coordinates of the location where the image was taken. This location data may then be used by the object recognition engines to restrict their image search to images of objects that are associated with provided coordinates.

The received image is processed using various object recognition engines (1830). As described above, matching objects may be located in the received image by comparing stored object representations with the received image. The object recognition engines may include, but are not limited to, an optical character recognition engine, a rigid textured object recognition engine, a face recognition engine, and an articulate object re-cognition engine.

Each engine may compare the received image of an object with one or more stored representations of objects. The stored representations of objects may comprise images, for example. Each object recognition engine may, as an output, indicate which of the stored representations of objects it matched with the image, along with a confidence value. The stored representation of an object that is found to match the received image with the highest confidence value is selected. In some implementations a minimum confidence value may be selected such that no representation of an object is selected as a match unless it exceeds the minimum confidence value. Where no representation of an object meets the minimum confidence value, an error may be sent to the submitting user device, or the user may be asked to provide another image, for example.

Advertisements associated with the recognized objects are returned to the user device along with any additional content (1840). One or more of the stored representations of objects may have associated advertisements. The advertisements may have been provided by advertisers who bid on having an advertisement displayed when an image matching the particular representation of an object is received. The advertisements may be stored with each advertisement's associated representation of an object, or may be stored separately. The advertisements may be provided to the user device along with any additional non-advertisement content related to the received image.

For example, an online merchant may bid to have an advertisement for a particular DVD displayed when an image matching the stored representation of that DVD is received. Later, a user may see the DVD at a store and take a picture of the DVD using a mobile phone in order to receive more information about the DVD. When the image matching the representation of the DVD is received, the associated advertisement is retrieved. The received image may have also been used as a query to a search engine to produce non-advertisement search engine results related to the DVD. The associated advertisement may be combined with the non-advertisement search engine results and sent to the user device.

Although the image retrieval concepts in FIGS. 17 and 18 have been described with respect to receiving an analyzing a digital photograph, the techniques are also applicable to other devices and media, such as digitized hand-drawn sketches, graphic images, and one or more frames in a video.

Figure 19:
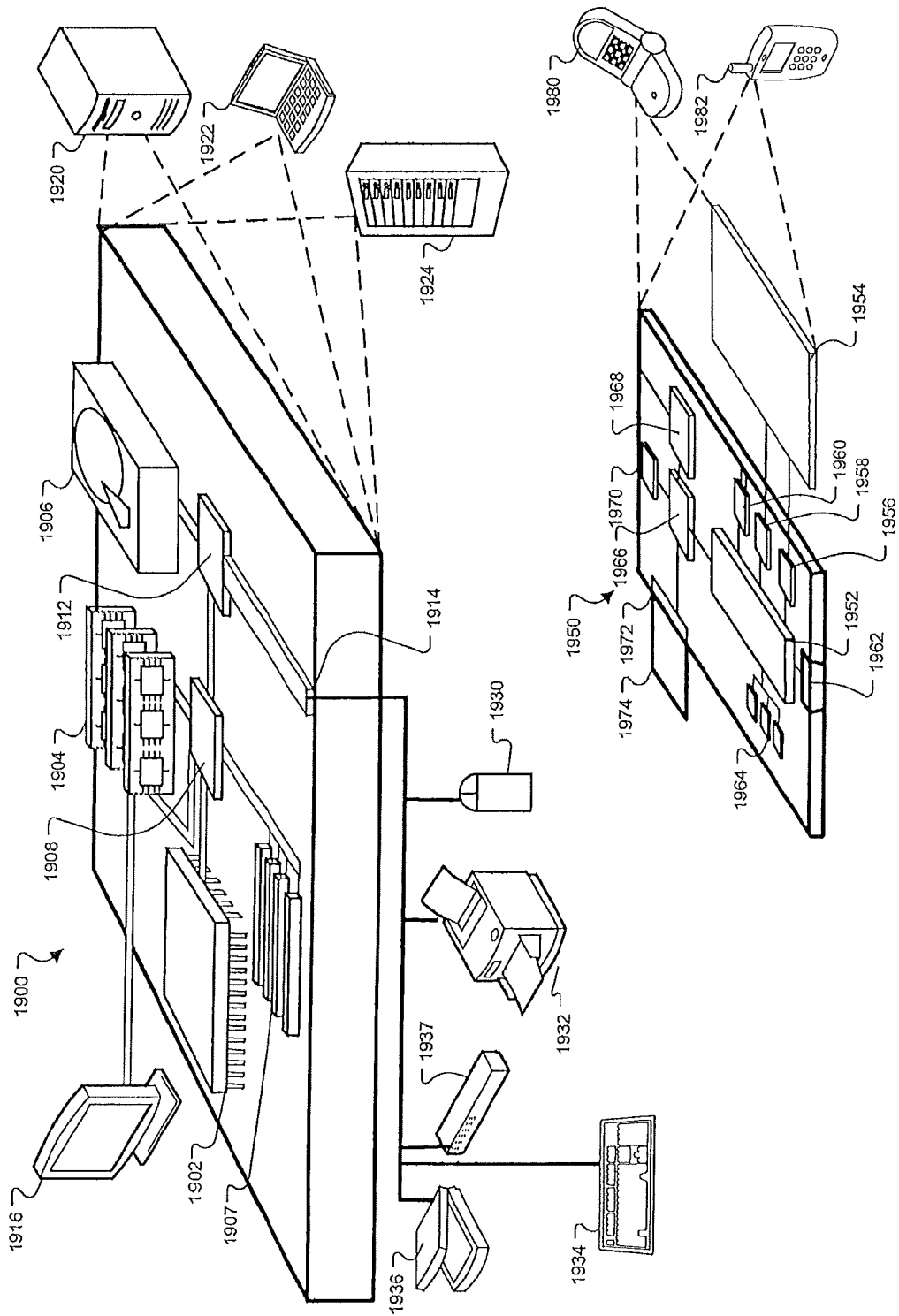
FIG. 19 is a block diagram illustrating an example generic computer and an example generic mobile computer device.

FIG. 19 shows an example of a generic computer device 1900 and a generic mobile computer device 1950, which may be used with the techniques described above. Computing device 1900 is intended to represent various forms of digital computers, such as laptops, desktops, workstations, personal digital assistants, television set-top boxes, servers, blade servers, mainframes, and other appropriate computers. Computing device 1950 is intended to represent various forms of mobile devices, such as personal digital assistants, cellular telephones, smartphones, and other similar computing devices. The components shown here, their connections and relationships, and their functions, are meant to be exemplary only, and are not meant to limit the implementations described and/or the claims.

Computing device 1900 includes a processor 1902, memory 1904, a storage device 1906, a high-speed interface 1908 connecting to memory 1904 and high-speed expansion ports 1910, and a low speed interface 1912 connecting to low speed bus 1914 and storage device 1906. Each of the components 1902, 1904, 1906, 1908, 1910, and 1912, are interconnected using various buses, and may be mounted on a common motherboard or in other manners as appropriate. The processor 1902 can process instructions for execution within the computing device 1900, including instructions stored in the memory 1904 or on the storage device 1906 to display graphical information for a GUI on an external input/output device, such as display 1916 coupled to high speed interface 1908. In other implementations, multiple processors and/or multiple buses may be used, as appropriate, along with multiple memories and types of memory. Also, multiple computing devices 1900 may be connected, with each device providing portions of the necessary operations (e.g., as a server bank, a group of blade servers, or a multi-processor system).

The memory 1904 stores information within the computing device 1900. In one implementation, the memory 1904 is a volatile memory unit or units. In another implementation, the memory 1904 is a non-volatile memory unit or unit. The memory 1904 may also be another form of computer-readable medium, such as a magnetic or optical disk.

The storage device 1906 is capable of providing mass storage for the computing device 1900. In one implementation, the storage device 1906 may be or contain, a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1904, the storage device 1906, memory on processor 1902, or a propagated signal.

The high speed controller 1908 manages bandwidth-intensive operations for the computing device 1900, while the low speed controller 1912 manages lower bandwidth-intensive operations. Such allocation of functions is exemplary only. In one implementation, the high-speed controller 1908 is coupled to memory 1904, display 1916 (e.g., through a graphics processor or accelerator), and to high-speed expansion ports 1910, which may accept various expansion cards (not shown). In the implementation, low-speed controller 1912 is coupled to storage device 1906 and low-speed expansion port 1914. The low-speed expansion port, which may include various communication ports (e.g., USB, Bluetooth, Ethernet, wireless Ethernet) may be coupled to one or more input/output devices, such as a pointing device 1930, a printer 1932, a keyboard 1934, a scanner 1936, or a networking device 1937 such as a switch or router, e.g., through a network adapter.

The computing device 1900 may be implemented in a number of different forms, as shown in the figure. For example, it may be implemented as a standard server 1920, or multiple times in a group of such servers. It may also be implemented as part of a rack server system 1924. In addition, it may be implemented in a personal computer such, as a laptop computer 1922. Alternatively, components from computing device 1900 may be combined with other components in a mobile device (not shown), such as device 1950. Each of such devices may contain one or more of computing device 1900, 1950, and an entire system may be made up of multiple computing devices 1900, 1950 communicating with each other.

Computing device 1950 includes a processor 1952, memory 1964, an input/output device such as a display 1954, a communication interface 1966, and a transceiver 1968, among other components. The device 1950 may also be provided with a storage device, such as a microdrive or other device, to provide additional storage. Each of the components 1950, 1952, 1964, 1954, 1966, and 1968, are interconnected using various buses, and several of the components may be mounted on a common motherboard or in other manners as appropriate.

The processor 1952 can execute instructions within the computing device 1950, including instructions stored in the memory 1964. The processor may be implemented as a chipset of chips that include separate and multiple analog and digital processors. The processor may provide, for example, for coordination of the other components of the device 1950, such as control of user interfaces, applications run by device 1950, and wireless communication by device 1950.

Processor 1952 may communicate with a user through control interface 1958 and display interface 1956 coupled to a display 1954. The display 1954 may be, for example, a TFT (Thin-Film-Transistor Liquid Crystal Display) display or an OLED (Organic Light Emitting Diode) display, or other appropriate display technology. The display interface 1956 may comprise appropriate circuitry for driving the display 1954 to present graphical and other information to a user. The control interface 1958 may receive commands from a user and convert them for submission to the processor 1952. In addition, an external interface 1962 may be provide in communication with processor 1952, so as to enable near area communication of device 1950 with other devices. External interface 1962 may provide, for example, for wired communication in some implementations, or for wireless communication in other implementations, and multiple interfaces may also be used.

The memory 1964 stores information within the computing device 1950. The memory 1964 can be implemented as one or more of a computer-readable medium or media, a volatile memory unit or units, or a non-volatile memory unit or units. Expansion memory 1974 may also be provided and connected to device 1950 through expansion interface 1972, which may include, for example, a SIMM (Single In Line Memory Module) card interface. Such expansion memory 1974 may provide extra storage space for device 1950; or may also store applications or other information for device 1950. Specifically, expansion memory 1974 may include instructions to carry out or supplement the processes described above, and may include secure information also. Thus, for example, expansion memory 1974 may be provide as a security module for device 1950, and may be programmed with instructions that permit secure use of device 1950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1964, expansion memory 1974, memory on processor 1952, or a propagated signal that may be received, for example, over transceiver 1968 or external interface 1962.

Device 1950 may communicate wirelessly through communication interface 1966, which may include digital signal processing circuitry where necessary. Communication interface 1966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1968. In addition, short-range communication may occur, such as using a Bluetooth, WiFi, or other such transceiver (not shown). In addition, GPS (Global Positioning System) receiver module 1970 may provide additional navigation- and location-related wireless data to device 1950, which may be used as appropriate by applications running on device 1950.

Device 1950 may also communicate audibly using audio codec 1960, which may receive spoken information from a user and convert it to usable digital information. Audio codec 1960 may likewise generate audible sound for a user, such as through a speaker, e.g., in a handset of device 1950. Such sound may include sound from voice telephone calls, may include recorded sound (e.g., voice messages, music files, etc.) and may also include sound generated by applications operating on device 1950.

The computing device 1950 may be implemented in a number of different forms, as shown in the figure. For example, it may be implemented as a cellular telephone 1980. It may also be implemented as part of a smartphone 1982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although the techniques and concepts generally have been described using a sub-image of an image, the techniques and concepts are applicable to an image. Also, the decomposition of an image into sub-images may be based on various image features, including, for example, color, shape, texture, in lieu of or in addition to decomposing local features.

A number of implementations have been described. Nevertheless, it will be understood that various modifications may be made. For example, various forms of the flows shown above may be used, with steps re-ordered, added, or removed. Other implementations are within the scope of the following claims.

What is claimed is:

1. A method comprising:
   receiving, by one or more computers, a reference image;
   identifying, by the one or more computers, a sub-image of the reference image by analyzing the reference image,
   receiving, by the one or more computers, a bid associated with the sub-image of the reference image, the bid comprising a bid for presenting a sponsored-content item,
   storing, by the one or more computers, the received bid in association with the reference image and the sponsored-content item;
   in response to a request for an advertisement, the request including a bid image, identifying, by the one or more computers, a sub-image of the bid image by analyzing the bid image and comparing, by the one or more computers, the reference image to the bid image wherein comparing the reference image to the bid image comprises comparing the sub-image of the bid image to the sub-image of the reference image;
   determining, by the one or more computers, a similarity between the reference image and the bid image based on the comparison, wherein determining the similarity comprises:
      generating a likelihood that the sub-image of the bid image is the same as the sub-image of the reference image using object recognition techniques, and
      determining whether the bid image is similar to the reference image based on a comparison between the likelihood and a threshold; and
   presenting, by the one or more computers, the sponsored-content item based on the similarity between the reference image and the bid image.

2. The method of claim 1, wherein receiving the reference image comprises receiving a collection of reference images, and the method further comprises:
   storing the collection of reference images; and
   storing the received bid in association with the collection of reference images and the sponsored-content item to be presented based on the bid and a bid image that is similar to at least one image in the collection of reference images.

3. The method of claim 1, wherein comparing the reference image to the bid image comprises comparing the reference image to the bid image to determine whether the bid image is identical to the reference image.

4. The method of claim 1 wherein comparing the reference image to the bid image comprises comparing the reference image to the bid image to determine whether the bid image is substantially similar to the reference image.

5. The method of claim 1 wherein identifying the sub-image of the reference image comprises receiving an indication of a portion that is less than all of the reference image.

6. The method of claim 1 wherein the received bid represents a maximum bid for presenting a sponsored-content item based on the reference image.

7. An electronic system comprising:
one or more processing devices; and
one or more machine-readable media configured to store instructions that are executable by the one or more processing devices to perform operations comprising:
identifying a sub-image of a received reference image by analyzing the reference image,
receiving a bid associated with the sub-image of the reference image, the bid comprising a bid for presenting a sponsored-content item,
storing the received bid in association with the reference image and the sponsored-content item;
in response to a request for an advertisement, the request including a bid image, identifying a sub-image of the bid image by analyzing the bid image and comparing the sub-image of the bid image to the sub-image of the reference image;
determining a similarity between the reference image and the bid image based on the comparison, wherein determining the similarity comprises:
generating a likelihood that the sub-image of the bid image is the same as the sub-image of the reference image using object recognition techniques, and
determining whether the bid image is similar to the reference image based on a comparison between the likelihood and a threshold; and
presenting the sponsored-content item based on the similarity between the reference image and the bid image.

8. The system of claim 7, wherein the instructions for receiving the reference image comprise instructions for receiving a collection of reference images, and the instructions further comprise instructions that are executable by the one or more processing devices to perform operations comprising:
storing the collection of reference images; and
storing the received bid in association with the collection of reference images and the sponsored-content item to be presented based on the bid and a bid image that is similar to at least one image in the collection of reference images.

9. The system of claim 7, wherein the instructions for comparing the reference image to the bid image comprise instructions for comparing the reference image to the bid image to determine whether the bid image is identical to the reference image.

10. The system of claim 7, wherein the instructions for comparing the reference image to the bid image comprise instructions for comparing the reference image to the bid image to determine whether the bid image is substantially similar to the reference image.

11. The system of claim 7, wherein the instructions for identifying the sub-image of the reference image comprise instructions for receiving an indication of a portion that is less than all of the reference image.

12. The system of claim 7 wherein the received bid represents a maximum bid for presenting a sponsored-content item based on the reference image.

13. A non-transitory computer readable medium storing software comprising instructions executable by a processing device that upon such execution cause the processing device to perform operations comprising:
identifying a sub-image of a received reference image by analyzing the reference image,
receiving a bid associated with the sub-image of the reference image, the bid comprising a bid for presenting a sponsored-content item,
storing the received bid in association with the reference image and the sponsored-content item;
in response to a request for an advertisement, the request including a bid image, identifying a sub-image of the bid image by analyzing the bid image and comparing the sub-image of the bid image to the sub-image of the reference image;
determining a similarity between the reference image and the bid image based on the comparison, wherein determining the similarity comprises:
generating a likelihood that the sub-image of the bid image is the same as the sub-image of the reference image using object recognition techniques, and
determining whether the bid image is similar to the reference image based on a comparison between the likelihood and a threshold; and
presenting the sponsored-content item based on the similarity between the reference image and the bid image.

14. The non-transitory computer readable medium of claim 13, wherein the instructions for receiving the reference image comprise instructions for receiving a collection of reference images, and the instructions further comprise instructions that are executable by the one or more processing devices to perform operations comprising:
storing the collection of reference images; and
storing the received bid in association with the collection of reference images and the sponsored-content item to be presented based on the bid and a bid image that is similar to at least one image in the collection of reference images.

15. The non-transitory computer readable medium of claim 13, wherein the instructions for comparing the reference image to the bid image comprise instructions for comparing the reference image to the bid image to determine whether the bid image is identical to the reference image.

16. The non-transitory computer readable medium of claim 13, wherein the instructions for comparing the reference image to the bid image comprise instructions for comparing the reference image to the bid image to determine whether the bid image is substantially similar to the reference image.

17. The non-transitory computer readable medium of claim 13, wherein the instructions for identifying the sub-image of the reference image comprise instructions for receiving an indication of a portion that is less than all of the reference image.

18. The non-transitory computer readable medium of claim 13, wherein the received bid represents a maximum bid for presenting a sponsored-content item based on the reference image.

* * * * *

UNITED STATES PATENT AND TRADEMARK OFFICE
CERTIFICATE OF CORRECTION

PATENT NO. : 8,346,604 B2
APPLICATION NO. : 13/415410
DATED : January 1, 2013
INVENTOR(S) : Yushi Jing et al.

It is certified that error appears in the above-identified patent and that said Letters Patent is hereby corrected as shown below:

Column 24, line 42, in Claim 1, delete "image" (second occurrence) and insert -- image, --

Signed and Sealed this
Twenty-sixth Day of February, 2013

Teresa Stanek Rea
*Acting Director of the United States Patent and Trademark Office*